US009720876B2

(12) United States Patent
Kazuno et al.

(10) Patent No.: US 9,720,876 B2
(45) Date of Patent: Aug. 1, 2017

(54) SERIAL COMMUNICATION CIRCUIT, INTEGRATED CIRCUIT DEVICE, PHYSICAL QUANTITY MEASURING DEVICE, ELECTRONIC APPARATUS, MOVING OBJECT, AND SERIAL COMMUNICATION METHOD

(71) Applicant: Seiko Epson Corporation, Tokyo (JP)

(72) Inventors: Masataka Kazuno, Kofu (JP); Katsuhito Nakajima, Hachioji (JP); Takashi Aoyama, Chino (JP)

(73) Assignee: Seiko Epson Corporation (JP)

( * ) Notice: Subject to any disclaimer, the term of this patent is extended or adjusted under 35 U.S.C. 154(b) by 815 days.

(21) Appl. No.: 14/059,786

(22) Filed: Oct. 22, 2013

(65) Prior Publication Data
US 2014/0115212 A1  Apr. 24, 2014

(30) Foreign Application Priority Data

Oct. 23, 2012 (JP) ................................. 2012-234129

(51) Int. Cl.
G06F 1/00 (2006.01)
G06F 13/42 (2006.01)

(52) U.S. Cl.
CPC ...... G06F 13/4295 (2013.01); G06F 13/4291 (2013.01)

(58) Field of Classification Search
CPC ......................... G06F 13/4295; G06F 13/4291
USPC ........................................................ 710/301
See application file for complete search history.

(56) References Cited

U.S. PATENT DOCUMENTS

| 3,771,143 A | * | 11/1973 | Taylor | G11B 20/182 360/25 |
| 3,900,837 A | * | 8/1975 | Hunter | G06F 12/08 326/105 |
| 4,760,570 A | * | 7/1988 | Acampora | H04L 49/25 370/417 |
| 5,051,989 A | * | 9/1991 | Negishi | H04B 7/2123 370/347 |
| 5,257,356 A | * | 10/1993 | Brockmann | G06F 13/368 710/110 |
| 5,544,332 A | * | 8/1996 | Chen | G06F 13/362 700/14 |

(Continued)

FOREIGN PATENT DOCUMENTS

| JP | 56-066946 A | 6/1981 |
| JP | 2007-230514 A | 9/2007 |
| JP | 2007-285745 A | 11/2007 |

OTHER PUBLICATIONS

Extended European Search Report and Opinion for Application No. 13189482.6 dated Feb. 13, 2014.

*Primary Examiner* — Paul R Myers
(74) *Attorney, Agent, or Firm* — Harness, Dickey & Pierce, P.L.C.

(57) ABSTRACT

A serial communication circuit includes a receiving unit configured to serially receive input data including a command and a synchronization identification code that is different from the command and a determining unit configured to receive the synchronization identification code from the receiving unit and when the synchronization identification code coincides with a slave selection value, to instruct a start of response processing based on the command.

20 Claims, 17 Drawing Sheets

(56) References Cited

U.S. PATENT DOCUMENTS

| | | | | |
|---|---|---|---|---|
| 5,646,456 | A * | 7/1997 | Udoh | B60R 25/24 180/287 |
| 5,928,345 | A * | 7/1999 | Tetzlaff | G05B 15/02 340/3.5 |
| 6,029,219 | A * | 2/2000 | Michizono | G06F 13/362 710/111 |
| 6,128,358 | A * | 10/2000 | Urata | G11B 20/1426 375/359 |
| 6,304,921 | B1 * | 10/2001 | Rooke | G06F 12/0676 710/3 |
| 6,353,908 | B1 * | 3/2002 | Heinrich | H04L 1/14 370/224 |
| 6,505,265 | B1 * | 1/2003 | Ishikawa | G06F 13/364 710/107 |
| 6,922,790 | B2 * | 7/2005 | Smith | H04L 12/44 710/105 |
| 7,802,039 | B2 * | 9/2010 | Morita | G06F 13/1689 710/110 |
| 8,516,174 | B2 * | 8/2013 | Goerlich | 710/105 |
| 2003/0038842 | A1 * | 2/2003 | Peck | G06F 11/263 715/763 |
| 2003/0145144 | A1 * | 7/2003 | Hofmann | G06F 13/364 710/110 |
| 2003/0229743 | A1 * | 12/2003 | Brown | G06F 13/364 710/113 |
| 2004/0093450 | A1 | 5/2004 | Andreas | |
| 2004/0117529 | A1 * | 6/2004 | Solomon | G06F 13/4031 710/113 |
| 2007/0208475 | A1 | 9/2007 | Shimizu | |
| 2008/0183928 | A1 | 7/2008 | Devila et al. | |
| 2009/0125657 | A1 * | 5/2009 | Hsieh | G06F 13/102 710/110 |
| 2009/0193165 | A1 | 7/2009 | Hsieh et al. | |
| 2009/0193180 | A1 * | 7/2009 | Ito | G06F 13/385 711/103 |
| 2010/0131676 | A1 | 5/2010 | Escamilla | |
| 2010/0318706 | A1 * | 12/2010 | Kobayashi | G06F 13/364 710/114 |
| 2011/0185094 | A1 * | 7/2011 | Okada | G06F 13/28 710/113 |
| 2012/0072628 | A1 | 3/2012 | Crockett et al. | |
| 2012/0217950 | A1 * | 8/2012 | Peting | H05B 33/0824 323/312 |
| 2012/0226965 | A1 * | 9/2012 | Hammerschmidt | H03M 13/093 714/807 |
| 2013/0297829 | A1 * | 11/2013 | Berenbaum | G06F 13/4256 710/3 |

* cited by examiner

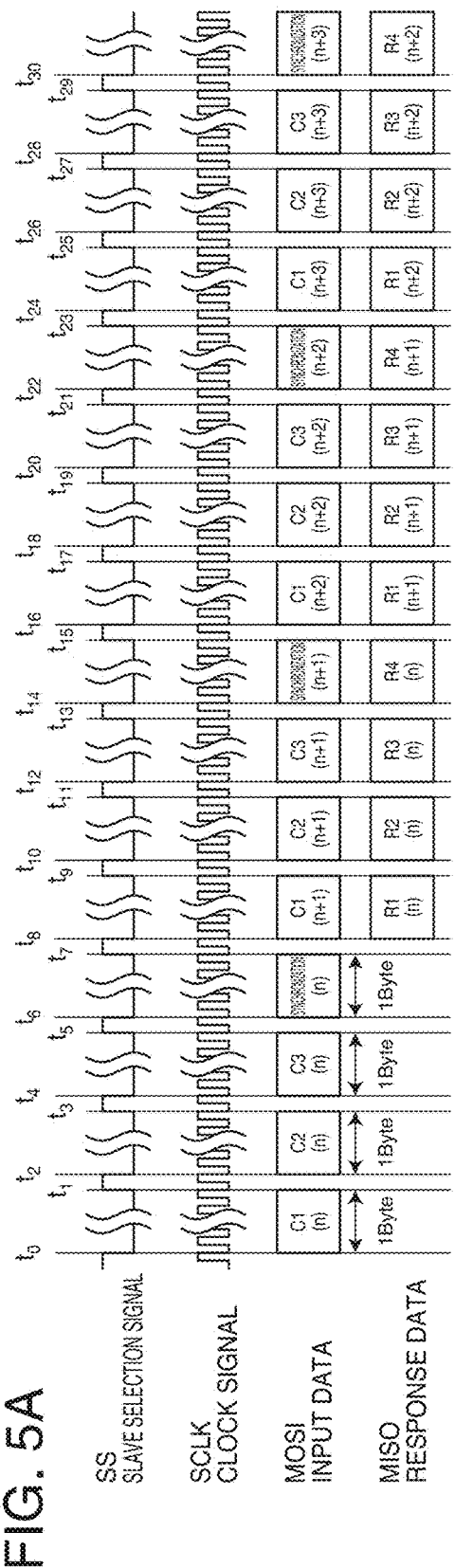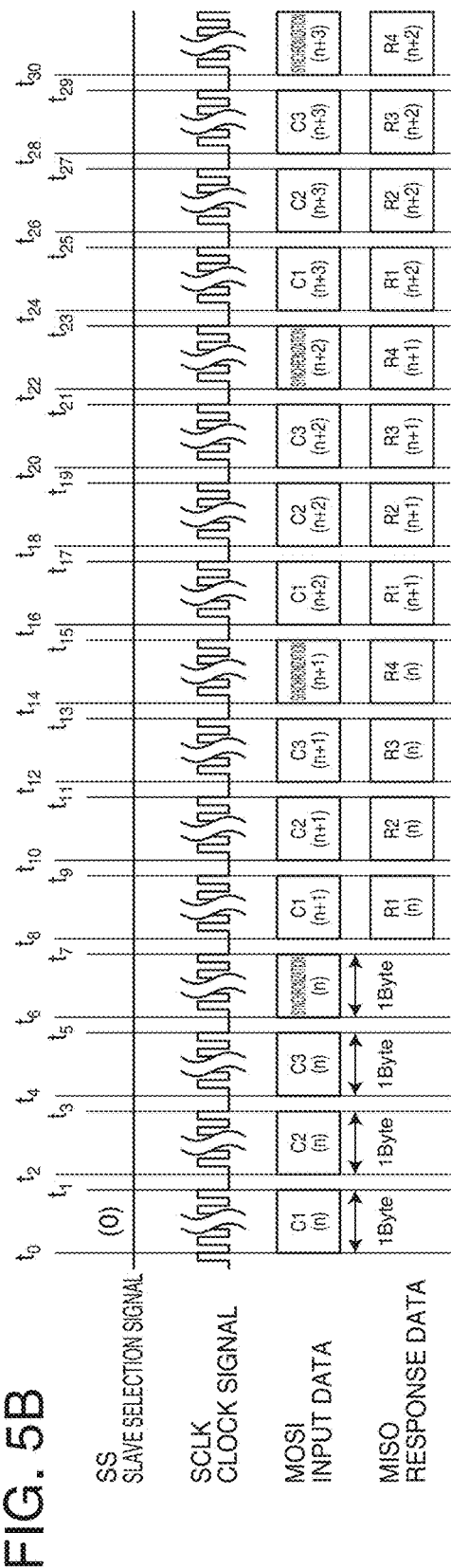

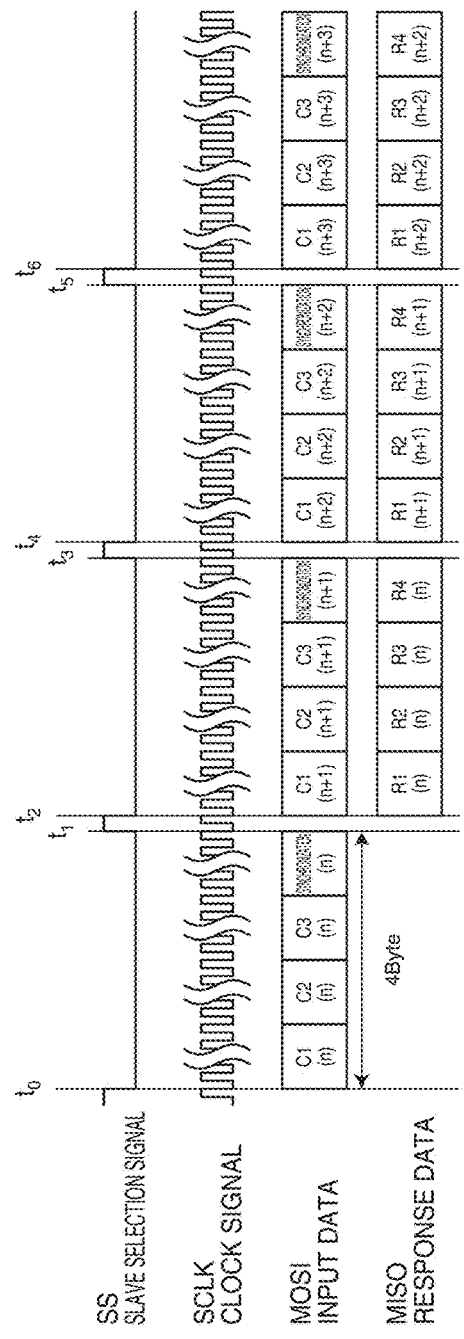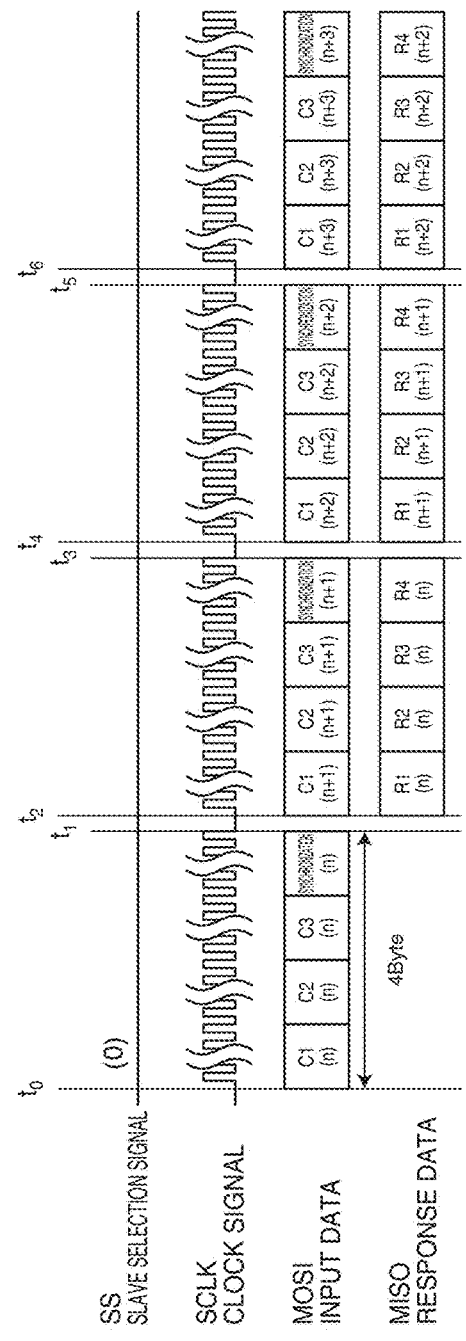

| COMMAND NAME | COMMAND (COMMAND CODE) | | | SYNCHRONIZATION IDENTIFICATION CODE |
| --- | --- | --- | --- | --- |
| | COMMAND 1 bit 31-24 | COMMAND 2 bit 23-16 | COMMAND 3 bit 15-8 | bit 7-0 |
| FIRST COMMAND (PHYSICAL QUANTITY OUTPUT) | 01000100 | 00100110 | 01010011 | 01011000 |
| SECOND COMMAND (ID CODE OUTPUT) | 01100000 | 00110010 | 00011011 | |
| THIRD COMMAND (NOP) | 00110000 | 00011010 | 00001111 | |
| FOURTH COMMAND | 00100100 | 01010010 | 00101011 | |
| ... | ... | ... | ... | ... |

FIG. 11

| COMMAND NAME | RESPONSE DATA (DATA USED FOR RESPONSE PROCESSING) | | | | |
|---|---|---|---|---|---|
| | RESPONSE 1 | | RESPONSE 2 | RESPONSE 3 | RESPONSE 4 |
| | bit 31 | bit 30-27 | bit 26-24 | bit 23-21 | bit 20-16 | bit 15-8 | bit 7-0 |
| FIRST COMMAND (PHYSICAL QUANTITY OUTPUT) | CEF | FLAG OTHER THAN CEF | COMMAND PECULIAR ID (HIGH ORDER) | COMMAND PECULIAR ID (LOW ORDER) | CHECKSUM | PHYSICAL QUANTITY (DETECTION DATA) | |
| SECOND COMMAND (ID CODE OUTPUT) | ... | | | | | 00000000 | ID CODE |
| THIRD COMMAND (NOP) | ... | | | | | 00000000 | 00000000 |
| FOURTH COMMAND | ... | | | | | INTERNAL STATUS | |
| ... | | | | | | | |

(DURING SYNCHRONIZATION IDENTIFICATION CODE ERROR) 11111111_11111111_11111111_11111111

FIG. 12

SERIAL COMMUNICATION CIRCUIT, INTEGRATED CIRCUIT DEVICE, PHYSICAL QUANTITY MEASURING DEVICE, ELECTRONIC APPARATUS, MOVING OBJECT, AND SERIAL COMMUNICATION METHOD

BACKGROUND

1. Technical Field

The present invention relates to a serial communication circuit, an integrated circuit device, a physical quantity measuring device, an electronic apparatus, a moving object, a serial communication method, and the like.

2. Related Art

Serial communication is sometimes used for, for example, transfer of data on the inside of an electronic apparatus in order to reduce the number of wires, because it is difficult to realize synchronization when a wire is long in parallel communication.

As shown in FIG. 1 of JP-A-2007-285745, an SPI (Serial Peripheral Interface) for enabling full duplex communication is sometimes used as a system of the serial communication. For example, an integrated circuit device and a physical quantity measuring device including a serial communication circuit of an SPI system include four terminals for serial communication.

The four terminals are a first terminal configured to receive a slave selection signal with which a master (e.g., a host CPU) selects a slave (e.g., an integrated circuit device and a physical quantity measuring device), a second terminal configured to receive a clock signal for serial transfer, a third terminal configured to receive input data, and a fourth terminal configured to output response data. In the following explanation, to facilitate understanding of the explanation, the first terminal is also referred to as SS terminal (Slave Select terminal).

The master is expected to include the four terminals that have input and output directions that are in opposite directions.

However, among host CPUs functioning as masters, there is known a host CPU including only three terminals excluding the SS terminal. It is assumed that the host CPU including only the three terminals excluding the SS terminal is connected to, for example, only one slave. In this case, communication can be performed between the host CPU and the slave by fixing an SS terminal on the slave side (e.g., fixed to '0', i.e., a low level).

In general, it is difficult to change the host CPU (change the host CPU including only the three terminals for the serial communication to the host CPU including the four terminals for the serial communication) because the influence on the entire system including the host CPU is large. That is, the integrated circuit device and the physical quantity measuring device on the slave side including the serial communication circuit of the SPI system are likely to be connected to both the host CPU including the three terminals for the serial communication and to the host CPU including the four terminals for the serial communication.

As described in JP-A-2007-230514, it is likely that the serial communication is also executed in electronic apparatuses mounted on mobile bodies such as an automobile, an airplane, a ship, and a train that require high safety. In such use, for example, when the host CPU including only the three terminals and the physical quantity measuring device are connected and caused to perform the serial communication in the SPI system, for example, an SS terminal of the physical quantity measuring device is set to '0' on a substrate. However, if the SS terminal of the physical quantity measuring device changes to '1', i.e., a high level due to the influence of noise or the like and the serial communication circuit on the slave side interprets the SS terminals as being unselected, the communication is immediately disabled. That is, the serial communication is unsuitable for a use such as an automobile having low reliability of communication and requiring high safety.

Therefore, in the past, in the use such as the automobile requiring high safety, a plurality of kinds of integrated circuit devices or physical quantity measuring devices on the slave side are prepared and selected according to the number of terminals for serial communication of the host CPU. Therefore, it is necessary to manufacture integrated circuit devices or physical quantity measuring devices in which, although the internal operations are equivalent, the numbers of terminals are different. This causes problems in costs and product management.

SUMMARY

An advantage of some aspects of the invention is to solve at least a part of the problems described above, and the invention can be implemented in the following forms or application examples.

Some aspects of the invention provides, for example, a serial communication circuit, an integrated circuit device, a physical quantity measuring device, an electronic apparatus, a moving object, and a serial communication method that can connect to both a master including three terminals for serial communication of the SPI system and a master including four terminals for serial communication of the SPI system and can execute highly reliable communication.

In the following explanation, serial communication of the SPI system that the serial communication circuit performs while being connected to a host CPU including four terminals is referred to as SPI communication of a four-wire system and serial communication of the SPI system that the serial communication circuit performs while being connected to a host CPU including three terminals excluding an SS terminal is referred to as SPI communication of a three-wire system.

Application Example 1

A serial communication circuit according to this application example includes: a receiving unit configured to serially receive input data including a command and a synchronization identification code that is different from the command; and a determining unit configured to receive the synchronization identification code from the receiving unit and to instruct, when the synchronization identification code coincides with a slave selection value, a start of response processing based on the command.

The serial communication circuit according to this application example includes at least the receiving unit and the determining unit. The receiving unit serially receives input data including a command and a synchronization identification code transmitted from a master, which is a communication partner. The receiving unit receives the synchronization identification code as a delimiter of the command. Therefore, the receiving unit preferably receives the synchronization identification code, for example, after the command.

The command is a command code received from the master. The master causes the serial communication circuit to execute the response processing based on the command. The response processing may be, for example, processing for writing a value in a register inside the serial communication circuit according to an instruction of the command or may be processing for generating response data and serially outputting the response data to the master according to an instruction of the command.

The synchronization identification code is a code indicating that the master selects the serial communication circuit of the application example (i.e., a slave such as an integrated circuit device and a physical quantity measuring device including the serial communication circuit of this application example) and gives timing for starting the response processing. The synchronization identification code may be a fixed value. However, a part or all of the bits of the synchronization identification code may be variable.

The determining unit receives the synchronization identification code from the receiving unit and compares the synchronization identification code with a predetermined value. When the synchronization identification code coincides with the slave selection value, the determining unit determines that the master selects the serial communication circuit of this application example and determines that the response processing can be started. When the receiving unit includes a shift register for receiving input data, the synchronization identification code received by the determining unit may be a bit string in a position where the synchronization identification code should be present. That is, the determining unit may always compare a part of input data shifted in synchronization with a clock signal (a bit string that could be the synchronization identification code) with the predetermined value.

In this case, when the synchronization identification code is included in the input data, the serial communication circuit can recognize that the serial communication circuit is selected by the master. The serial communication circuit can recognize the timing for starting the response processing. That is, a function of a slave selection signal received by an SS terminal can be realized by the synchronization identification code.

Therefore, the serial communication circuit can perform communication in the SPI system while being connected to a host CPU including three terminals excluding the SS terminal. When the serial communication circuit is connected to a host CPU including four terminals including the SS terminal, if the slave selection signal is inactive (i.e., the serial communication circuit according to the invention is not selected), the response processing is not performed because the synchronization identification code received from the master does not coincide with the predetermined value. When the slave selection signal is active, the determination is performed according to the synchronization identification code as in the SPI communication of the three-wire system. However, this is not against the fact that the slave selection signal is active. That is, the SPI communication of the four-wire system can also be executed.

When the SPI communication of the three-wire system is performed, it is assumed that an SS terminal on the serial communication circuit side (the slave side) in the invention is fixed to '0'. In this case, even if the SS terminal on the slave side changes to '1' (inactive) because of the influence of noise, in the serial communication circuit in the embodiment of the invention, since the function of the slave selection signal can be realized by the synchronization identification code, communication is not immediately disabled. It is assumed that input data is neglected in the receiving unit in a period in which the SS terminal on the slave side changes to '1'. For example, this is only treated as an error of the synchronization identification code. Occurrence of the error is communicated to the master. The serial communication is continuously executed.

Therefore, the serial communication circuit in this application example can be connected to both the master including three terminals for serial communication of the SPI system and the master including four terminals for serial communication of the SPI system and can execute highly reliable communication.

The serial communication circuit in this application example realizes a function of the slave selection signal (also referred to as chip select signal) using the synchronization identification code included in the set of input data. Therefore, the serial communication circuit is not limited to the SPI system and is also applicable to serial communication systems of other systems including the SS terminal that could be excluded. In the SPI system, there are the third terminal and the fourth terminal for data. However, for example, even in serial communication in which the terminals are changed to one bi-directional data terminal, it is possible to apply the serial communication circuit in this application example. Even when the serial communication circuit is connected to the master excluding the SS terminal, it is possible to execute highly reliable serial communication.

Application Example 2

The serial communication circuit according to the application example described above may be configured such that the serial communication circuit further includes a transmission control unit configured to control a serial output of response data, which is the response processing, and the determining unit receives the command from the receiving unit and to instruct, on the basis of the command, the transmission control unit to perform generation of the response data and the serial output of the response data.

Application Example 3

The serial communication circuit according to the application example described above may be configured such that the determining unit instructs, when the synchronization identification code does not coincide with the slave selection value, the transmission control unit to serially output a fixed value as the response data.

Application Example 4

The serial communication circuit according to the application example described above may be configured such that the determining unit instructs, when an error is included in the command, the transmission control unit to retransmit the response data serially output immediately preceding the command after setting an error flag included in the response data to a predetermined value.

Application Example 5

The serial communication circuit according to the application example described above may be configured such that the transmission control unit generates the response data of M bytes (M is an integer equal to or larger than 2), and the receiving unit receives the command and the synchronization identification code both having data sizes in byte units, which are the M bytes when totaled.

The serial communication circuit according to the application examples includes the transmission control unit. The transmission control unit generates response data and controls a serial output to the master. The generation of the response data and the control of the serial output to the master are performed according to an instruction received from the determining unit. The determining unit receives a command from the receiving unit and instructs, on the basis of the command, the transmission control unit to perform at least one of the generation of the response data and the serial output of the response data.

The response processing includes the serial output of the response data to the master executed by the transmission control unit. However, the transmission control unit executes the generation of the response data and the serial output of the response data after receiving the instruction from the determining unit. That is, even if the serial communication circuit includes the transmission control unit, timing for starting the response processing is determined on the basis of the synchronization identification code.

Therefore, the serial communication circuit according to the application examples can realize, with the synchronization identification code, a function of the slave selection signal received by the SS terminal. Therefore, it is possible to execute highly reliable serial communication of the SPI system without depending on a type of a master connected to the serial communication circuit.

In the serial communication circuit, the determining unit may instruct, when the synchronization identification code does not coincide with the predetermined value, the transmission control unit to serially output a fixed value.

In this case, the serial communication circuit cannot acquire a correct synchronization identification code. Therefore, it is likely that the fixed value serially output to the master deviates by several bits. However, if the fixed value includes only a value (e.g., '1') indicating an error during normal time, the master can recognize the occurrence of an error in which the synchronization identification error cannot be easily detected (hereinafter referred to as synchronization identification code error) because values indicating errors are continuously acquired. The master can take an appropriate measure such as retransmission of the command and the synchronization identification code.

That is, when the synchronization identification code does not coincide with the predetermined value, the serial communication circuit serially outputs the fixed value to enable the master to easily recognize the occurrence of the synchronization identification code error and enable highly reliable serial communication.

In the serial communication circuit, the determining unit may instruct, when an error is included in the command, the transmission control unit to retransmit the response data serially output immediately preceding the command after setting an error flag included in the response data to a predetermined value.

In this case, since the serial communication circuit cannot acquire a correct command, the serial communication circuit cannot generate response data requested by the master. Therefore, for example, a value of a register included in the response data is not updated. When the transmission control unit executes the serial outputs in that state, the response data serially output immediately preceding the command is retransmitted. At this point, the determining unit causes the transmission control unit to retransmit the response data after setting the error flag to a predetermined value (e.g., '1').

Consequently, the master can check a value of the error flag of the retransmitted response data and easily recognize the occurrence of an error such as a code abnormality or a bit shift in the command (hereinafter referred to as command error). The master can take an appropriate measure such as retransmission of the command and the synchronization identification code.

That is, when an error is included in the command, the serial communication circuit retransmits the response data serially output immediately preceding the command after setting the error flag included in the response data to the predetermined value to enable the master to easily recognize the occurrence of the command error and enable highly reliable serial communication.

In the serial communication circuit, the transmission control unit may generate response data of M (M is an integer equal to or larger than 2). The receiving unit may receive the command and the synchronization identification code both having data sizes in byte units, which are M bytes in total.

In this case, the size of the data (the command and the synchronization identification code) received by the serial communication circuit and the size of the response data transmitted to the master by the serial communication circuit are the same (M bytes). Therefore, it is possible to realize full duplex communication with high transfer efficiency.

Both the command and the synchronization identification code have data sizes in byte units. Therefore, it is possible to divide the command and the synchronization identification code in byte units and perform comparison and determination processing while providing a degree of freedom for setting the sizes of the command and the synchronization identification code to different sizes (e.g., 3 bytes for the command and 1 byte for the synchronization identification code). It is possible to reduce a processing time compared with entire input data (e.g., 4 bytes) of a set. Further, it is possible to suppress an increase in a circuit size of the serial communication circuit.

Application Example 6

The serial communication circuit according to the application example described above may be configured such that the serial communication circuit uses the synchronization identification code, a value of which is different by at least two bits compared with a part or all of the command having the same number of bits as the number of bits of the synchronization identification code.

Application Example 7

The serial communication circuit according to the application example described above may be configured such that the input data includes a plurality of commands, and a first command and a second command included in the plurality of commands are different from each other by at least two bits or more.

According to these application examples, when the command and the synchronization identification code received by the serial communication circuit are compared, these codes are different from each other by 2 bits or more. Therefore, even if a command error of one bit is caused by the influence of noise or the like during transfer of the command, the serial communication circuit can prevent the command from being recognized as the synchronization identification code by mistake. Therefore, the serial communication circuit enables highly reliable serial communication.

When there are a plurality of the commands, the synchronization identification code is different from all the commands by two bits or more when compared with the commands. The numbers of bits of the commands are assumed to be equal to or larger than the number of bits of the synchronization identification code. Even when compared with a part of the command having the same number of bits as the number of bits of the synchronization identification code, the synchronization identification code is different by 2 bits or more. However, for example, when both the command and the synchronization identification code have data sizes in byte units, a part of the command compared with the synchronization identification code may be a part of the command divided in byte units.

When the serial communication circuit receives a plurality of the commands, two different commands are respectively referred to as first command and second command. Then, when the first command and the second command are compared, codes of the commands are different from each other by two bits or more. Therefore, even if a command error of one bit is caused by the influence of noise or the like during transfer of a command, the serial communication circuit can prevent the command from being recognized as another command by mistake. Therefore, the serial communication circuit enables highly reliable serial communication.

Application Example 8

An integrated circuit device according to this application example includes: the serial communication circuit described above; a first terminal configured to receive a slave selection signal indicating whether the serial communication circuit is selected; a second terminal configured to receive a clock signal; a third terminal configured to receive the input data; and a fourth terminal configured to serially output data based on the command. The serial communication circuit serially receives, even when the first terminal is fixed to a predetermined value, the input data from the third terminal on the basis of the clock signal from the second terminal and performs, as the response processing, serial output of data based on the command from the fourth terminal.

The integrated circuit device (Integrated Circuit, IC) in this application example includes the first to fourth terminals and the serial communication circuit connected to the terminals and configured to execute communication with a master on the outside.

The integrated circuit device includes the serial communication circuit. Therefore, the integrated circuit device can be connected to both a master including three terminals for serial communication of the SPI system and a master including four terminals for serial communication of the SPI system. Even when a signal level of the SS terminal is inverted (e.g., changed from '0' to '1') by the influence of noise or the like, since the integrated circuit device can continuously perform the serial communication, reliability of communication is high. The integrated circuit device is also suitable for a use such as an automobile requiring high safety. Therefore, it is unnecessary to manufacture a plurality of kinds of the integrated circuit devices according to the types of masters. It is possible to reduce the problems in costs and product management.

Application Example 9

A physical quantity measuring device according to this application example includes: the serial communication circuit described above; and a sensor unit including at least one sensor configured to detect a predetermined physical quantity. The serial communication circuit receives detection data requested by the command from the sensor unit and executes the response processing using the detection data.

The physical quantity measuring device in this application example includes the sensor unit including at least one sensor configured to detect the predetermined physical quantity and the serial communication circuit. The physical quantity measuring device includes the serial communication circuit. Therefore, the physical quantity measuring device can be connected to both a master including three terminals for serial communication of the SPI system and a master including four terminals for serial communication of the SPI system. The physical quantity measuring device can serially output detection data from the sensor unit requested by a command to a master.

The physical quantity measuring device can continuously perform serial communication even if a level of a slave selection signal is inverted (e.g., changed from '0' to '1') by the influence of noise or the like. Therefore, reliability of communication is high. The physical quantity measuring device is also suitable for a use such as an automobile requiring high safety. Therefore, it is unnecessary to manufacture a plurality of kinds of the physical quantity measuring devices according to the types of masters. It is possible to reduce problems in costs and product management.

Application Example 10

An electronic apparatus according to this application example includes the physical quantity measuring device described above.

Application Example 11

A moving object according to this application example includes the electronic apparatus described above.

The electronic apparatus and the moving object in the application examples use the physical quantity measuring device including the serial communication circuit. Therefore, reliability of serial communication in the inside is high. It is possible to reduce problems in costs and product management that occur when a plurality of kinds of the physical quantity measuring devices are prepared. Therefore, it is possible to provide the electronic apparatus and the moving object having high reliability and excellent in terms of costs.

Application Example 12

A serial communication method according to this application example includes: serially receiving a set of input data including a command and a synchronization identification code different from the command; and instructing, when the received synchronization identification code coincides with a predetermined value, a start of execution of response processing based on the command.

Because of the same reason as the explanation concerning the serial communication circuit, the serial communication method in this application example can connect to both a master including three terminals for serial communication of the SPI system and a master including four terminals for serial communication of the SPI system and can execute highly reliable communication.

BRIEF DESCRIPTION OF THE DRAWINGS

Embodiments of the invention will be described with reference to the accompanying drawings, wherein like numbers reference like elements.

FIGS. 5A and 5B are respectively timing charts in 1-byte transfer of SPI communication of a four-wire system and a three-wire system.

FIGS. 6A and 6B are respectively timing charts in 4-byte transfer of the SPI communication of the four-wire system and the three-wire system.

FIG. 11 is a diagram showing a specific example of a command and a synchronization identification code used in the serial communication circuit in the embodiment.

FIG. 12 is a diagram showing a specific example of response data generated by the serial communication circuit in the embodiment.

DESCRIPTION OF EXEMPLARY EMBODIMENTS

1. Schematic Configuration of a Serial Communication Circuit

Figure 1:
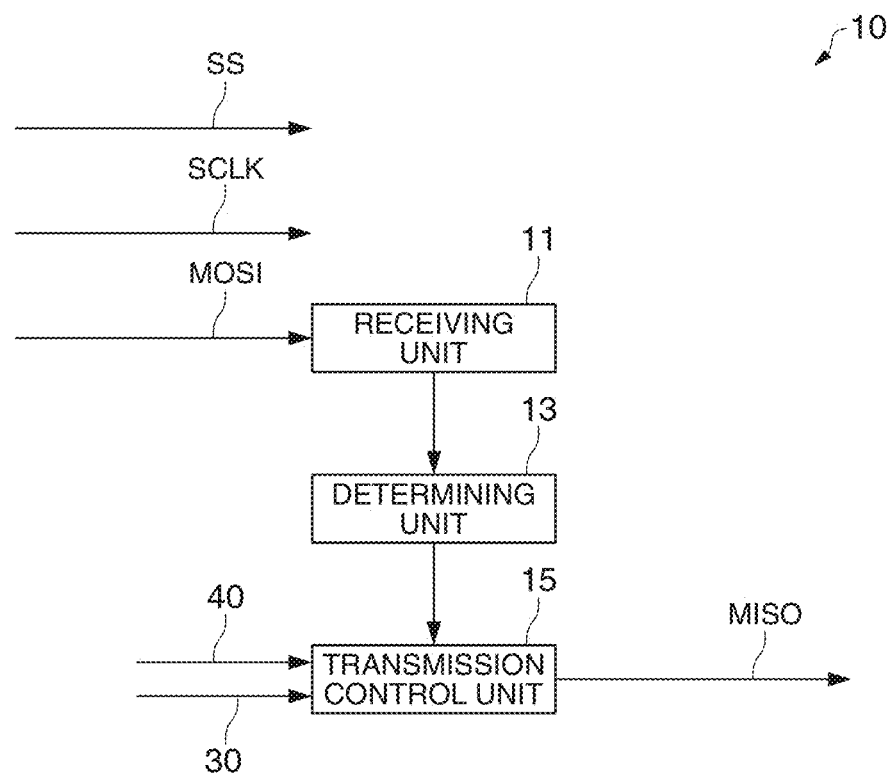
FIG. 1 is a block diagram of a serial communication circuit in an embodiment.

FIG. 1 is a block diagram of a serial communication circuit 10 in an embodiment. The serial communication circuit 10 is a communication circuit on a slave side that communicates with a not-shown master in an SPI system. As shown in FIG. 1, the serial communication circuit 10 receives a slave selection signal SS, a clock signal SCLK, and input data MOSI and outputs response data MISO.

The slave selection signal SS is usually a signal used by the master to select a slave including the serial communication circuit 10 (e.g., an integrated circuit device and a physical quantity measuring device including the serial communication circuit 10). The slave selection signal SS is, for example, low active. At this point, in a section where the slave selection signal SS is '1', the serial communication circuit 10 may determine that the slave is not selected by the master and neglect at least one of the clock signal SCLK and the input data MOSI.

The clock signal SCLK is a clock for realizing synchronization of serial communication. Communication speed is set according to a clock frequency of the clock signal SCLK. The serial communication circuit 10 can perform high-speed communication compared with an I2C (Inter-Integrated Circuit) of a standard mode by operating with the clock signal SCLK of, for example, 10 MHz. The slave selection signal SS and the clock signal SCLK affect all functional blocks included in the serial communication circuit 10. Therefore, display of individual wires to the functional blocks is omitted.

The input data MOSI and the response data MISO are respectively data transmitted from the master to the serial communication circuit 10 on the slave side and data transmitted from the serial communication circuit 10 to the master. The input data MOSI is a set of data including a command and a synchronization identification code. The command is a command code transmitted from the master. The master causes the serial communication circuit 10 to execute processing (response processing) based on the command. The synchronization identification code is explained below.

The response data MISO is data based on the command included in the input data MOSI. For example, the response data MISO may be configured by data selected from a detection signal 40 or a status signal 30 on the basis of the command and requested by the master. The detection signal 40 is a signal based on a physical quantity detected by the sensor element 4 (see FIG. 2). The status signal 30 is a signal representing a result of a failure diagnosis executed by a failure diagnosis unit 20 (see FIG. 2). Processing for generating the response data MISO and serially outputting the response data MISO to the master is main response processing of the serial communication circuit 10. However, the response processing is not limited to this. For example, when the command is NOP (no operation), no operation by the serial communication circuit 10 is also included in the response processing.

The serial communication circuit 10 includes a receiving unit 11, a determining unit 13, and a transmission control unit 15. The receiving unit 11 serially receives the input data MOSI. In this embodiment, it is assumed that a set of input data MOSI is 32-bit data, i.e., 4-byte data. The set of the input data MOSI includes a 3-byte command and a 1-byte synchronization identification code. Sizes of the command and the synchronization identification code are not specifically limited. For example, in order to reduce a load of arithmetic processing of the determining unit as in this embodiment, the sizes may be sizes in byte units. However, the sizes are not limited to this.

The determining unit 13 receives the synchronization identification code from the receiving unit 11 and compares the synchronization identification code with a predetermined value. When the synchronization identification code coincides with a slave selection value, which is the predetermined value, the determining unit 13 determines that the master selects the slave including the serial communication circuit 10 (e.g., the integrated circuit device and the physical quantity measuring device including the serial communication circuit 10) and determines that the response processing can be started. Therefore, the serial communication circuit 10 can learn, through comparison processing of the synchronization identification code in the determining unit 13, "selection by the master" and "start timing of the response processing" that can be usually learned by the slave selection signal SS.

The determining unit 13 receives the command from the receiving unit 11 and instructs, on the basis of the command, the transmission control unit 15 to perform at least one of generation of response data and a serial output of the response data MISO.

The transmission control unit 15 generates the response data MISO and serially outputs the response data MISO to the master according to the instruction received from the determining unit 13. As shown in FIG. 1, concerning input and output, the serial communication circuit 10 is the same as and has compatibility with a communication circuit that performs the SPI communication of the four-wire system in the past. However, the serial communication circuit 10 always receives the synchronization identification code other than the command as a set of input data. Unlike the communication circuit in the past, the serial communication circuit 10 can learn, according to the comparison processing for the synchronization identification code in the determining unit 13, "selection by the master" and "start timing for the response processing" without depending on the slave selection signal SS.

2. The Physical Quantity Measuring Device and the Integrated Circuit Device

Figure 2:
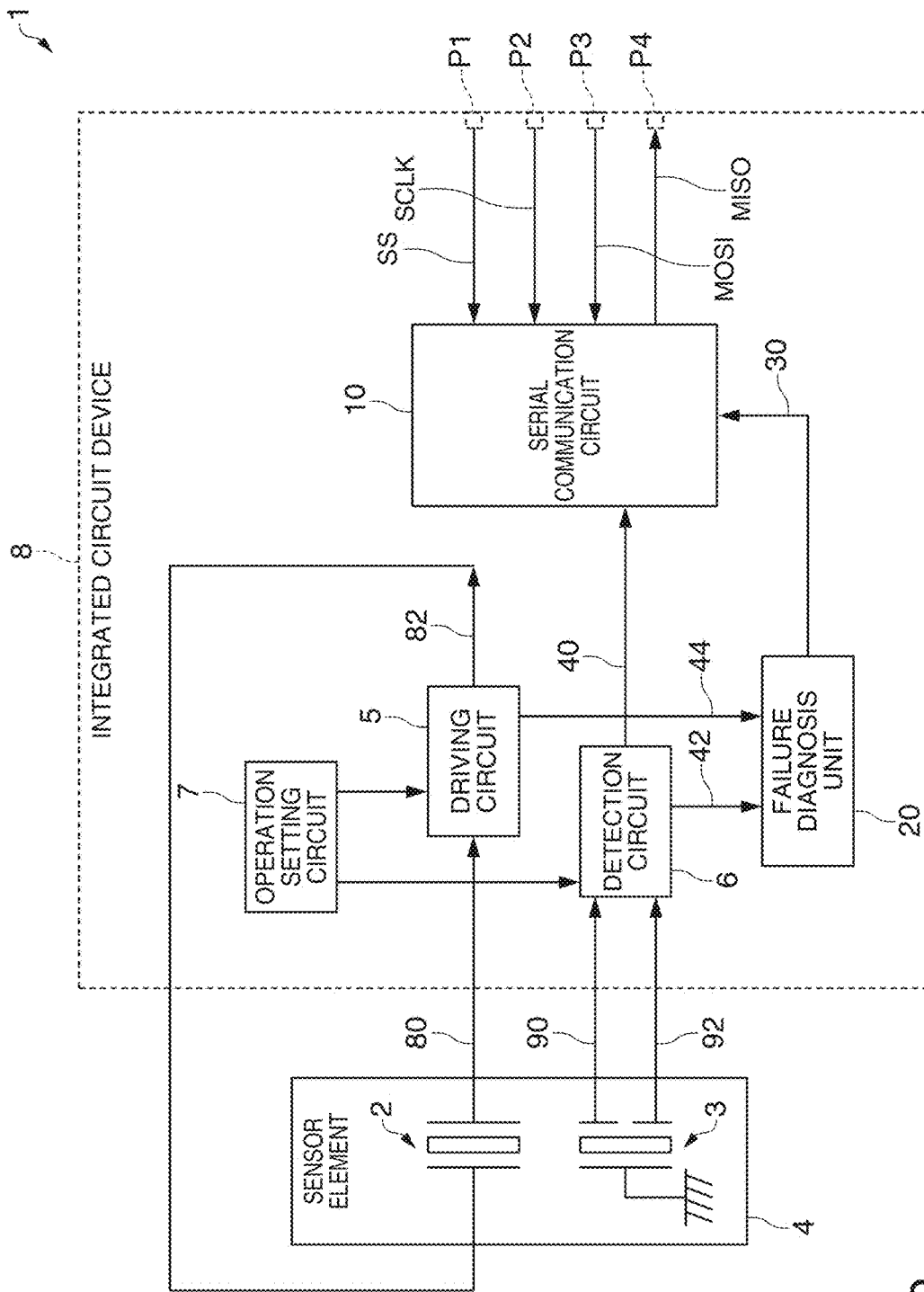
FIG. 2 is a diagram of an integrated circuit device and a physical quantity measuring device including the serial communication circuit in the embodiment.

FIG. 2 is a block diagram of a physical quantity measuring device 1 and an integrated circuit device 8 including the serial communication circuit 10 in this embodiment. The serial communication circuit 10 in this embodiment configures a part of the integrated circuit device 8. The integrated circuit device 8 is included in the physical quantity measuring device 1. Therefore, the serial communication circuit 10 in this embodiment simultaneously configures a part of the physical quantity measuring device 1. In FIG. 2, the same components as the components shown in FIG. 1 are denoted by the same reference numerals and signs and explanation of the components is omitted.

The physical quantity measuring device 1 includes the serial communication circuit 10, a sensor element 4, a driving circuit 5, a detection circuit 6, a failure diagnosis unit 20, and an operation setting circuit 7. In the physical quantity measuring device 1, the functional blocks excluding the sensor element 4 configure the integrated circuit device 8. The integrated circuit device 8 includes a first terminal P1 configured to receive the slave selection signal SS, a second terminal P2 configured to receive the clock signal SCLK, a third terminal P3 configured to receive the input data MOSI, and a fourth terminal P4 configured to serially output the response data MISO. In this example, the first to fourth terminals in the integrated circuit device 8 are also terminals of the physical quantity measuring device 1. The following explanation concerning the physical quantity measuring device 1 is regarded as explanation concerning the integrated circuit device 8.

The sensor element 4 includes, for example, integrated oscillators 2 and 3 and detects angular velocity. That is, a physical quantity detected by the sensor element in this example is the angular velocity. In FIG. 2, differential signals 90 and 92 are signals corresponding to the magnitude of the angular velocity and are signals output by the sensor element 4. In this embodiment, for noise resistance, the differential signals 90 and 92 are output from the oscillator 3. However, non-differential one signal may be output.

The driving circuit 5 generates a driving signal 82 and supplies the driving signal 82 to the oscillator 2. The driving circuit 5 receives an excitation current 80 from the oscillator 2 and forms an oscillation loop. The magnitude of the differential signals 90 and 92 are proportional to the excitation current 80. Therefore, the driving circuit 5 controls the driving signal 82 to fix the amplitude of the excitation current 80 irrespective of a change of a measurement environment.

The detection circuit 6 generates the detection signal 40 on the basis of the differential signals 90 and 92. The detection signal 40 is a signal corresponding to the magnitude of the angular velocity detected by the sensor element 4 and is a signal output by the detection circuit 6.

The detection signal 40 can be serially transmitted to the master via the serial communication circuit 10. The detection circuit 6 receives the differential signals 90 and 92, performs, for example, conversion into a format requested by the master, and generates the detection signal 40.

The operation setting circuit 7 applies optimum operation setting to the driving circuit 5 and the detection circuit 6. The operation setting circuit 7 includes, for example, a reference voltage circuit and a memory circuit. The operation setting circuit 7 performs optimization through voltage setting, parameter setting, and the like for the driving circuit 5 and the detection circuit 6.

The failure diagnosis unit 20 performs a failure diagnosis concerning at least one of the driving circuit 5 and the detection circuit 6. The failure diagnosis unit 20 receives information necessary for performing the failure diagnosis as internal signals 42 and 44 from the driving circuit 5 and the detection circuit 6.

The failure diagnosis unit 20 outputs the status signal 30, which is a signal representing a result of an executed failure diagnosis. The status signal 30 may include, for example, bits (e.g., at high level '1' when an error occurs) representing results of respective failure diagnoses executed by the failure diagnosis unit 20.

The serial communication circuit 10 receives the detection signal 40 and the status signal 30, selects data requested by the command, and generates the response data MISO. Note that, in this embodiment, the response data is not configured by only the detection signal 40 and the status signal 30. For example, the response data MISO includes a command error flag (CEF) set by the determining unit 13 (see FIG. 1) and representing whether an error is included in the command.

The physical quantity measuring device 1 including the serial communication circuit 10 in this embodiment includes the sensor element 4 configured to detect an angular velocity. However, the physical quantity measuring device 1 may include, instead of or in addition to the sensor element 4, a sensor element configured to detect temperature, a sensor element configured to detect acceleration, or the like. The integrated circuit device 8 may include only a part of the functional blocks shown in FIG. 2 or may include the sensor element 4.

Figure 13:
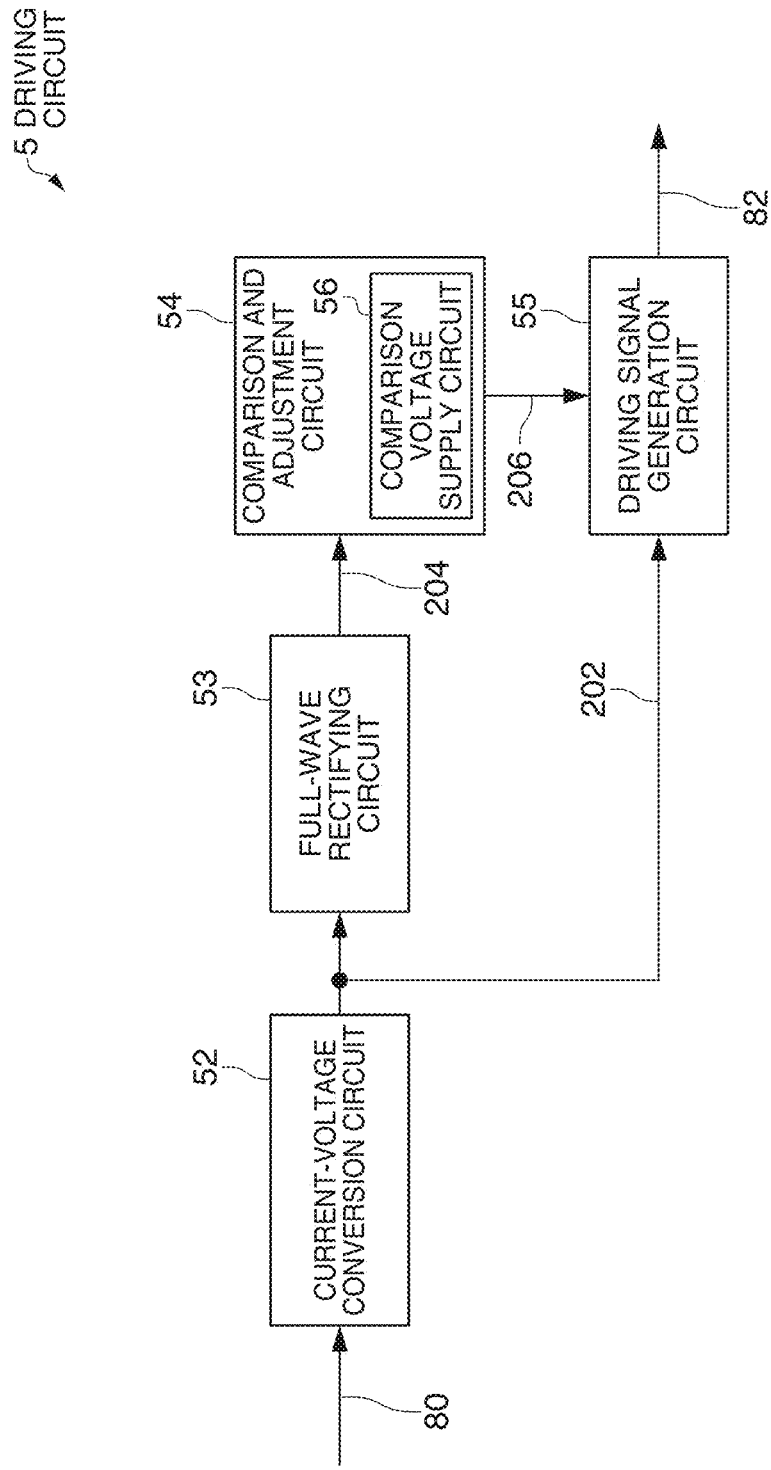
FIG. 13 is a block diagram showing an example of a driving circuit of the physical quantity measuring device including the serial communication circuit in the embodiment.

The driving circuit 5 and the detection circuit 6 are realized by, for example, a configuration explained below. FIG. 13 shows a configuration example of the driving circuit 5. The same components as the components shown in FIGS. 1 and 2 are denoted by the same reference numerals and signs and explanation of the components is omitted. The driving circuit 5 includes, for example, a current-voltage conversion circuit 52, a full-wave rectifying circuit 53, a comparison and adjustment circuit 54, and a driving signal generation circuit 55.

The current-voltage conversion circuit 52 converts the excitation current 80 received from the oscillator 2 into a voltage and outputs a signal 202. The full-wave rectifying circuit 53 full-wave rectifies the signal 202 received from the current-voltage conversion circuit 52, obtains a voltage close to a direct current, and outputs a signal 204.

The comparison and adjustment circuit 54 compares the signal 204 received from the full-wave rectifying circuit 53 with a voltage received from a comparison voltage supply circuit 56 and outputs a signal 206, which is a signal reflecting a comparison result, to the driving signal generation circuit 55.

The driving signal generation circuit 55 generates the driving signal 82 on the basis of the signal 202 received from the current-voltage conversion circuit 52 and adjusts the amplitude of the driving signal 82 on the basis of the signal 206.

The magnitude of the differential signals 90 and 92 is proportional to the excitation current 80. Therefore, the driving circuit 5 controls and outputs the driving signal 82 to fix the amplitude of the excitation current 80 such that angular velocity is accurately measured irrespective of a change of an environment.

Figure 14:
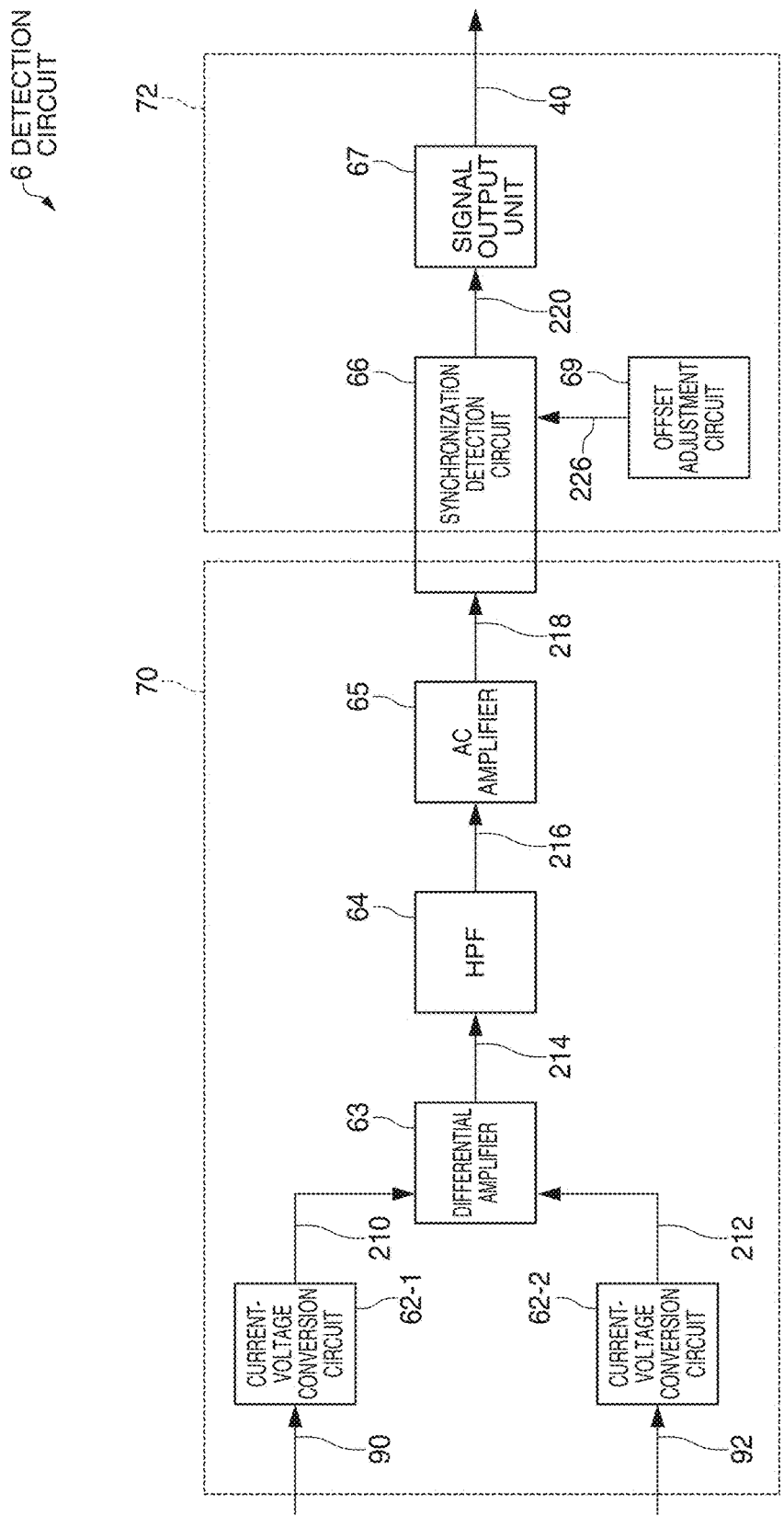
FIG. 14 is a block diagram showing an example of a detection circuit of the physical quantity measuring device including the serial communication circuit in the embodiment.

FIG. 14 shows one configuration example of the detection circuit 6. The same components as the components shown in FIGS. 1 and 2 are denoted by the same reference numerals and signs and explanation of the components is omitted. The detection circuit 6 receives the differential signals 90 and 92 from the sensor element 4. The detection circuit 6 performs processing necessary for the differential signals 90 and 92 and generates the detection signal 40 corresponding to the angular velocity detected by the sensor element 4.

Conversion into a direct-current signal is performed by a synchronization detection circuit 66. However, for convenience of explanation, a circuit that performs processing up to the conversion is represented as pre-stage circuit 70 and a circuit that performs processing after the conversion is represented as post-stage circuit 72.

As shown in FIG. 14, the pre-stage circuit 70 includes, for example, current-voltage conversion circuits 62-1 and 62-2, a differential amplifier circuit (a differential amplifier) 63, a high-pass filter (HPF) 64, an amplifier circuit (an AC amplifier) 65, and a part of the synchronization detection circuit 66.

The post-stage circuit 72 includes, for example, a part of the synchronization detection circuit 66, a signal output unit 67, and an offset adjustment circuit 69.

The voltage-current conversion circuits 62-1 and 62-2 respectively convert electric currents of the differential signals 90 and 92 into voltages. The differential signals 90 and 92 have a current value corresponding to the angular velocity detected by the sensor element 4. The current-voltage conversion circuit 62-1 and the current-voltage conversion circuit 62-2 have the same configuration.

The differential amplifier circuit 63 receives both signals 210 and 212 output from the current-voltage conversion circuits 62-1 and 62-2, amplifies a difference between the signals, and outputs the difference as a signal 214.

The high-pass filter 64 transmits a high-frequency component of the signal 214 and outputs the high-frequency component as a signal 216.

The amplifier circuit 65 amplifies the signal 216 and outputs a signal 218.

The synchronization detection circuit 66 receives the signal 218 and performs synchronization detection. At this point, for accurate measurement of angular velocity, an offset signal 226 is input from the offset adjustment circuit 69 to the synchronization detection circuit 66.

The signal output unit 67 receives a signal 220 output from the synchronization detection circuit 66, performs filtering by, for example, a low-pass filter, and performs amplification. The signal output unit 67 generates the detection signal 40 corresponding to the angular velocity detected by the sensor element 4.

Figure 15:
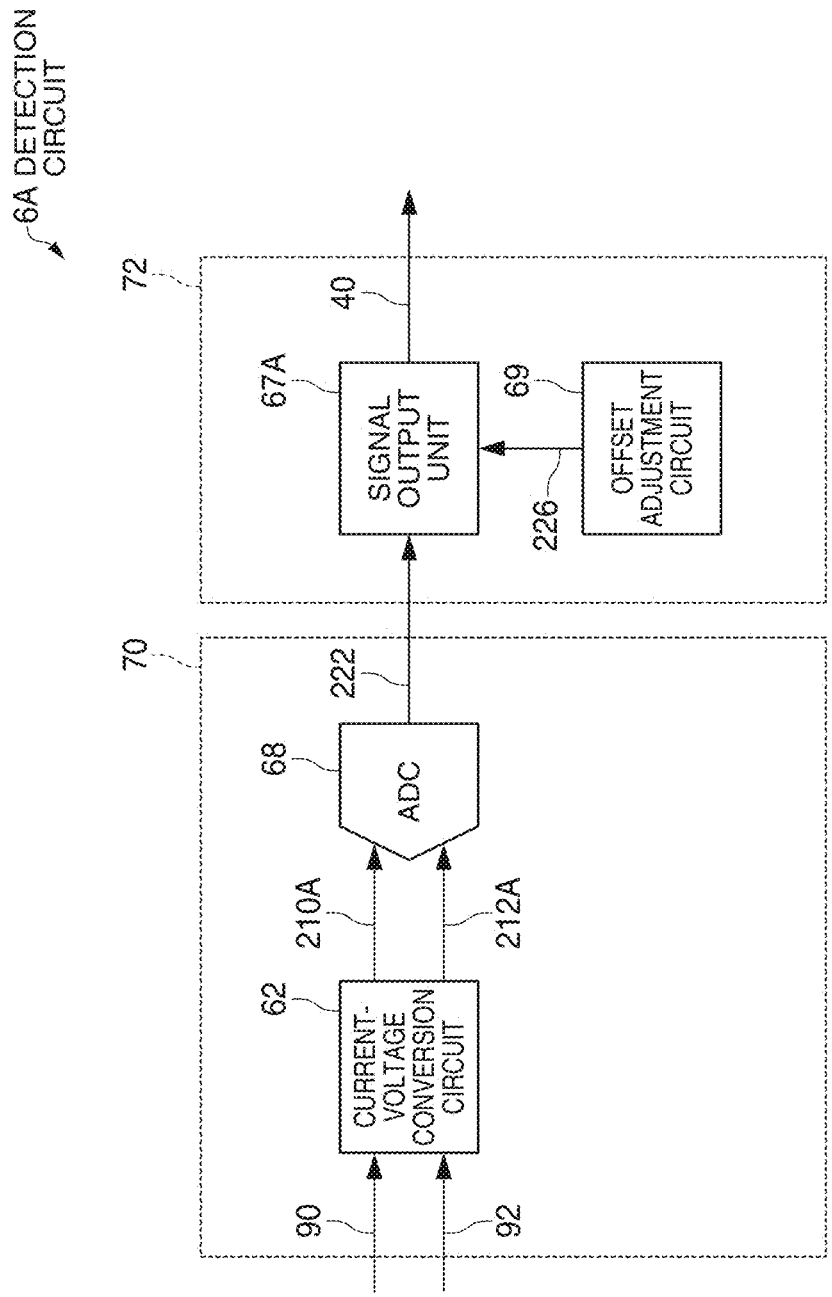
FIG. 15 is a block diagram showing another example of the detection circuit of the physical quantity measuring device including the serial communication circuit in the embodiment.

FIG. 15 shows a detection circuit 6A, which is another configuration example. The detection circuit 6A may be used instead of the detection circuit 6. The same components as the components shown in FIGS. 1 to 2 and FIG. 14 are denoted by the same reference numerals and signs and explanation of the components is omitted.

The detection circuit 6A includes, as the pre-stage circuit 70, for example, the current-voltage conversion circuit 62 for differential input and output and an AD converter (ADC) 68. The post-stage circuit 72 includes, for example, a signal output unit 67A and the offset adjustment circuit 69.

Unlike the detection circuit 6, after the current-voltage conversion circuit 62 converts the electric current of the differential signals 90 and 92 into a voltage, the detection circuit 6A immediately performs, using the AD converter 68, conversion into a signal 222 corresponding to a direct-current signal of the detection circuit 6.

Like the signal output unit 67 of the detection circuit 6, the signal output unit 67A of the post-stage circuit 72 performs filtering and amplification and performs offset adjustment on the basis of the offset signal 226. The circuit size of detection circuit 6A can be reduced compared with the detection circuit 6.

3. Connection to the Master

Figure 3A:
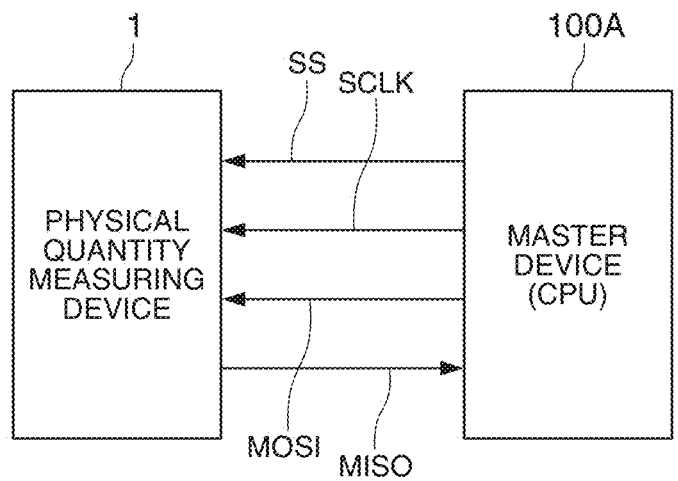
FIGS. 3A and 3B are diagrams showing a form of connection between the physical quantity measuring device including the serial communication circuit in the embodiment and master devices.
Figure 3B:
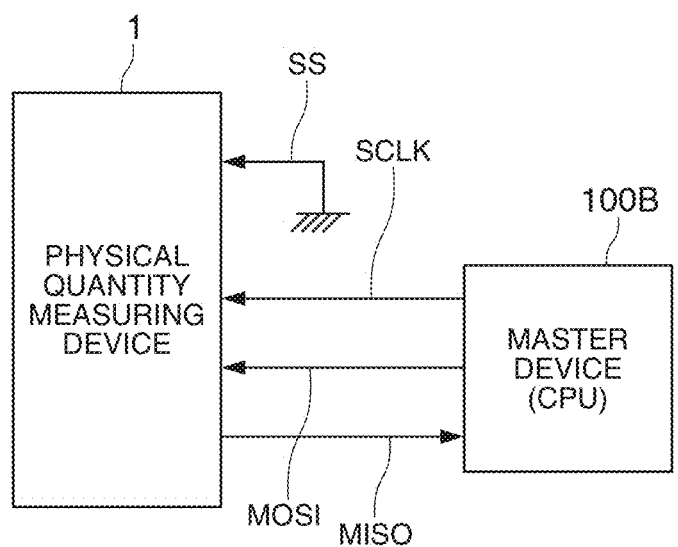

FIGS. 3A and 3B are diagrams showing connection between the physical quantity measuring device 1 (the slave) including the serial communication circuit 10 in this embodiment and master devices 100A and 100B, which are masters. The same components as the components shown in FIGS. 1 and 2 are denoted by the same reference numerals and signs and explanation of the components is omitted. The master devices 100A and 100B are, for example, CPUs.

FIG. 3A shows a state in which the physical quantity measuring device 1 is connected to the master device 100A including four terminals for serial communication. FIG. 3B shows a state in which the physical quantity measuring device 1 is connected to the master device 100B including only three terminals for serial communication. The physical quantity measuring device 1 including the serial communication circuit 10 in this embodiment can be connected to the CPUs having different numbers of terminals for serial communication and execute serial communication of the SPI system without changing the configuration of the terminals.

As explained above, the serial communication circuit 10 can learn "selection by the master" and "start timing for response processing", which are usually learned according to the slave selection signal SS, according to comparison processing of the synchronization identification code in the determining unit 13 (see FIG. 1). Therefore, as shown in FIG. 3B, even when the slave selection signal SS cannot be used, it is possible to execute serial communication in the SPI system.

In FIG. 3B, processing for fixing the slave selection signal SS to '0' is performed on the outside of the physical quantity measuring device 1. This is because the serial communication circuit 10 neglects at least one of the clock signal SCLK and the input data MOSI when the slave selection signal SS is '1'. It is preferable that the slave selection signal SS is pulled down on the inside of the physical quantity measuring device 1 (e.g., the first terminal P1 of the integrated circuit device 8). This is because, even if the fixing for setting the slave selection signal SS to '0' on the outside of the physical quantity measuring device 1 is released, the serial communication can be continuously executed.

Even when the slave selection signal SS instantaneously changes to "1" because of noise or the like, for example, the input data MOSI is neglected only in a section where the slave selection signal SS is '1'. The serial communication is continuously executed. At this point, a command error or a synchronization identification code error explained below are only treated as occurring. The master can recognize the occurrence of the error and take an appropriate measure such as retransmission of the command and the synchronization identification code.

Therefore, the physical quantity measuring device including the serial communication circuit 10 can be connected to the CPUs (the master devices 100A and 100B) having different numbers of terminals and can perform highly reliable serial communication. Therefore, the physical quantity measuring device 1 can be used for a use such as an automobile requiring high safety.

4. Details of the Serial Communication Circuit

Figure 4:
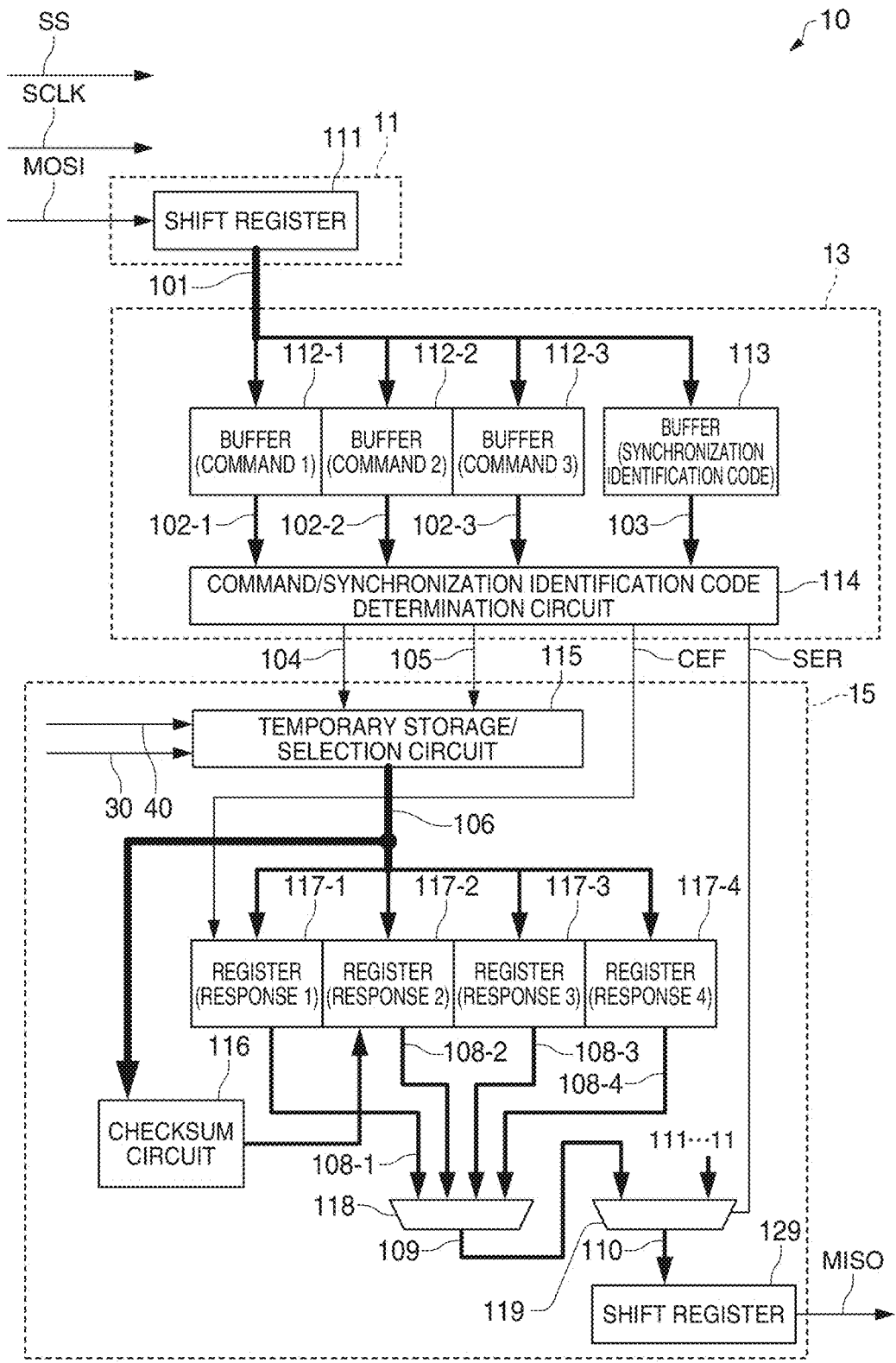
FIG. 4 is a detailed block diagram of the serial communication circuit in the embodiment.

FIG. 4 is a diagram showing a configuration example of the serial communication circuit 10 in this embodiment. The same components as the components shown in FIGS. 1 to 3 are denoted by the same reference numerals and explanation of the components is omitted.

As shown in FIG. 4, the receiving unit 11 includes a 4-byte (32-bit) shift register 111 and serially receives the input data MOSI. The input data MOSI may be LSB first. However, in the following explanation, it is assumed that the input data MOSI is MSB first.

The determining unit 13 includes buffers 112-1 to 112-3 configured to receive commands 1 to 3, a buffer 113 configured to receive a synchronization identification code, and a command/synchronization identification code determination circuit 114 configured to determine whether the synchronization identification code and the commands stored in the buffers have correct values.

A signal 101, which is a value of the shift register 111, is allocated to the buffers 112-1 to 112-3 and the buffer 113 of the determining unit 13 according to bits of the signal 101. Commands obtained by dividing a 3-byte command byte by byte are respectively referred to as command 1, command 2, and command 3 (see FIG. 11). The size of the synchronization identification code is 1 byte. Each of the sizes of the buffers 112-1 to 112-3 and the buffer 113 is 1 byte.

The command/synchronization identification code determination circuit 114 receives signals 102-1, 102-2, 102-3, and 103, which are respectively values of the buffers. In order to determine whether the synchronization identification code and the commands have correct values, the command/synchronization identification code determination circuit 114 executes comparison determination with expected values in 1-byte units. At this point, it is possible to reduce a processing time and suppress an increase in a circuit size compared with a processing time and a circuit size required when the comparison determination is performed using the 4-byte input data MOSI.

In this embodiment, the expected value of the synchronization identification code is a fixed value '01011000' but is not limited to this value. A plurality of the commands are present. However, codes of the commands are determined in advance. Therefore, the expected values of the commands 1 to 3 are apart of the code of anyone of the commands. For example, in an example shown in FIG. 11, expected values of the command 1 are '01000100', '01100000', '00110000', '00100100', and the like.

When the shift register 111 receives a set of the input data MOSI (4 bytes) but the synchronization identification code does not coincide with the expected value, the determining unit 13 causes the transmission control unit 15 to serially output a fixed value (all bits are '1') as response data (SER in FIG. 4). When any one of the commands 1 to 3 does not coincide with the expected value, the determining unit 13 causes the transmission control unit 15 to set a command error flag of response data (CEF in FIG. 4). When a command error occurs, the response data is not updated. Therefore, the response data is the same as response data serially output immediately preceding the response data except the command error flag.

When neither a synchronization identification code error nor a command error occurs, the determining unit 13 outputs a control signal to the transmission control unit 15. The control signal is, for example, a signal 104 for selecting necessary data from the detection signal 40 and the status signal 30 on the basis of the command and a signal 105 for instructing an update change and serial output timing of the response data.

The transmission control unit 15 includes a temporary storage/selection circuit 115, registers 117-1, 117-2, 117-3, and 117-4 configured to respectively retain responses 1, 2, 3, and 4 obtained by dividing the response data in byte units, a checksum circuit 116, selectors 118 and 119, and a shift register 129.

The transmission control unit 15 selects necessary data from the detection signal 40 and the status signal 30 according to the signals 104 and 105 received from the determining unit 13 and retains the data in the temporary storage/selection circuit 115. Temporarily stored data 106 is allocated to the registers 117-1 to 117-4 as appropriate and input to the checksum circuit 116 as well. The checksum circuit 116 calculates a checksum such that the master can determine whether an error occurs during communication and outputs the checksum to the register 117-2.

When an instruction to set a command error flag of response data is received from the determining unit 13, the transmission control unit 15 sets a CEF bit of the register 117-1 to '1'. The selector 118 receives values of the registers 117-1 to 117-4, which change to response data, respectively as 1-byte signals 108-1 to 108-4. The selector 118 selects the signals 108-1 to 108-4 in order according to a selection signal (not shown in the figure) based on the signal 105 received from the determining unit 13.

The selector 119 selects a fixed value (all bits are '1') when a synchronization identification code error occurs. The selector 119 selects a signal 109 from the selector 118 when a synchronization identification code error does not occur. The shift register 129 converts and serially outputs a parallel data signal 110.

5. Data Transfer Timing

FIGS. 5A to 7B are diagrams showing timing of data transfer in the SPI communication of the four-wire system and the three-wire system by the serial communication circuit 10 in the embodiment. The same components as the components in FIGS. 1 to 4 are denoted by the same reference numerals and signs and explanation of the components is omitted.

FIG. 5A shows timing of data transfer in the SPI communication of the four-wire system. As explained above, a set of input data and response data are 4-byte data. However, data to be communicated is delimited in 1-byte units. That is, the slave selection signal SS changes to '1' every time 1-byte data is communicated (periods t1 to t2, t3 to t4, . . . , and t29 to t30). The clock signal SCLK in that period is treated as not valid, i.e., neglected by the serial communication circuit 10.

FIG. 5B shows timing of data transfer in the SPI communication of the three-wire system performed using the serial communication circuit 10. In this case, even in the SPI communication of the three-wire system, when the master simply masks a pulse of the clock signal SCLK in the periods t1 to t2, t3 to t4, . . . , and t29 to t30, the SPI communication at completely the same timing can be performed.

In FIGS. 5A and 5B, C1, C2, and C3 of input data respectively mean the command 1, the command 2, and the command 3 obtained by dividing 3-byte command byte by byte. "Synchronization" means a 1-byte synchronization identification code. Parenthesized n, n+1, and the like are signs for representing a set in time series. For example, C1(n), C2(n), C3(n), and synchronization (n) included in a period t0 to t7 are a set of input data.

In FIGS. 5A and 5B, R1 to R4 of response data respectively means the responses 1, 2, 3, and 4 obtained by dividing the response data in byte units. Parenthesized n, n+1, and the like are added to correspond to a command on which the response data is based. That is, response data R1(n) to R4(n) represent that the response data R1(n) to R4(n) are generated on the basis of the command C1(n) to C3(n). These notations are the same in FIGS. 6A to 7B and FIGS. 9A to 10B referred to below.

In this example, the set of input data (the commands and the synchronization identification code) received by the serial communication circuit 10 is 4-byte data. The response data transmitted to the master by the serial communication circuit 10 is also 4-byte data. Therefore, there is no section where only one of reception and transmission is performed. Full duplex communication with high transfer efficiency is realized.

FIG. 6A shows timing in continuously transferring the set of input data and the response data (4 bytes) in the SPI communication of the four-wire system. On the other hand, FIG. 6B shows timing of data transfer of the SPI communication of the three-wire system performed using the serial communication circuit 10. Even in the SPI communication of the three-wire system of the 4-byte continuous transfer, when the master simply masks a pulse of the clock signal SCLK in the periods t1 to t2, t3 to t4, and t5 to t6, it is possible to perform the SPI communication at completely the same timing as the four-wire system.

Figure 7A:
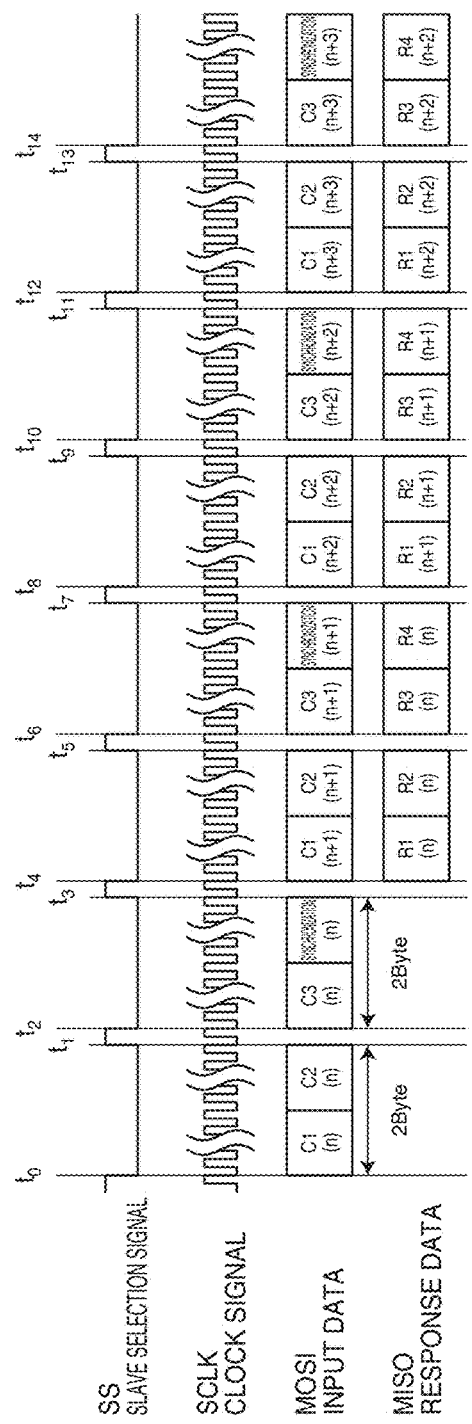
FIGS. 7A and 7B are respectively timing charts in 2-byte transfer of the SPI communication of the four-wire system and the three-wire system.
Figure 7B:
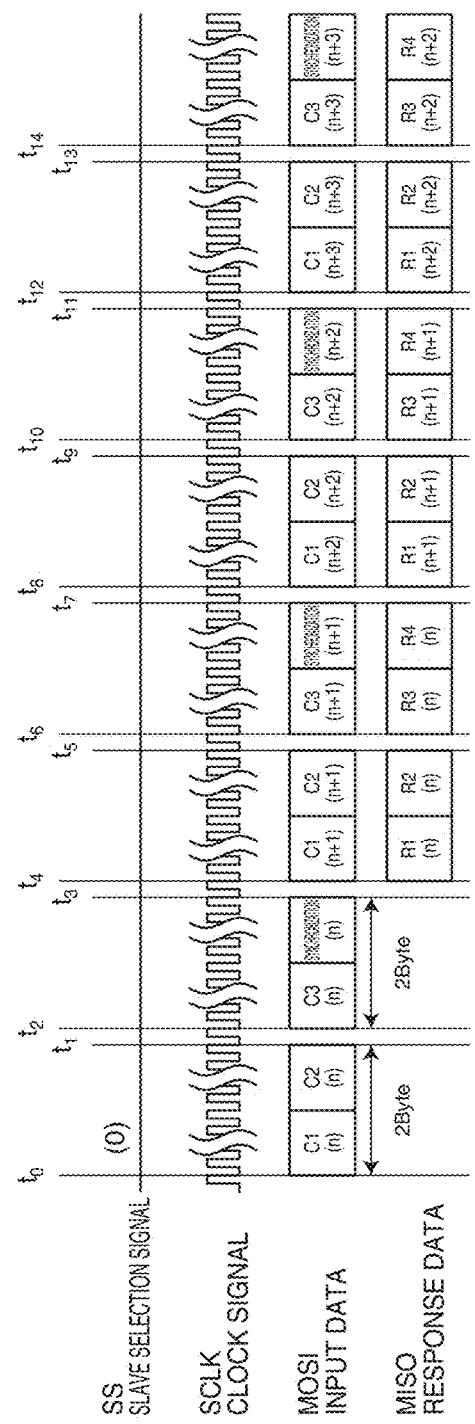

In the serial communication of the SPI system performed using the serial communication circuit 10, data to be communicated can be delimited in 2-byte units. FIG. 7A shows timing in the SPI communication of the four-wire system. In this case, as shown in FIG. 7B, it is possible to perform the SPI communication of the three-wire system at completely the same timing.

6. Details of Synchronization Identification Code Determination

The serial communication circuit 10 in this embodiment can learn "selection by the master" and "start timing for response processing" when the synchronization identification code coincides with the slave selection value, which is the predetermined value. Therefore, it is important to correctly determine that the synchronization identification code is received. Details of processing of the command/synchronization identification code determination circuit 114 are explained below.

Figure 8A:
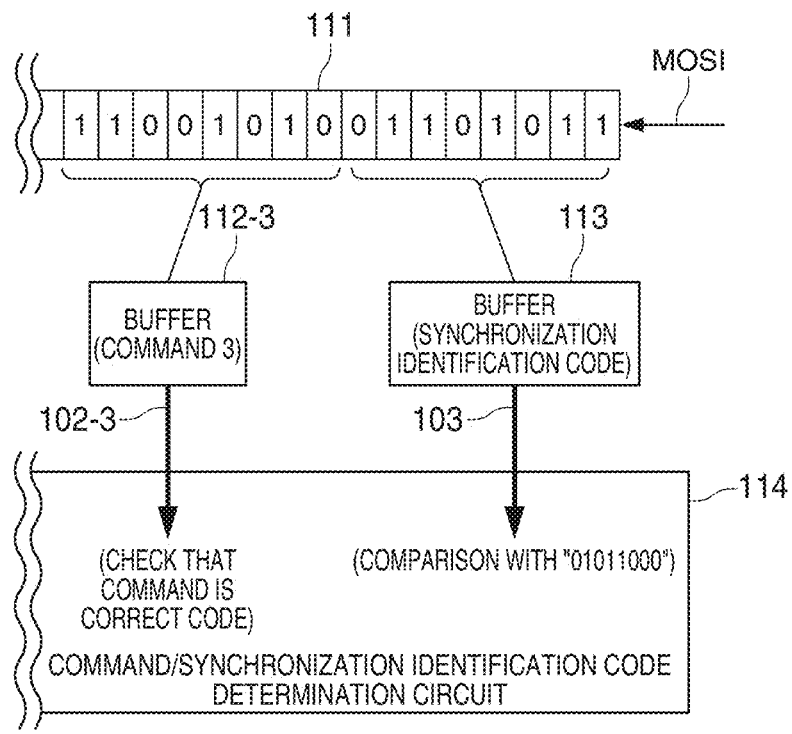
FIGS. 8A and 8B are diagrams for explaining determination of a synchronization identification code.

FIG. 8A is a diagram for explaining a correspondence relation between the command/synchronization identification code determination circuit 114 of the determining unit 13 and the shift register 111 of the receiving unit 11. The shift register 111 receives the input data MOSI of MSB first and shifts the input data MOSI bit by bit in synchronization with the clock signal SCLK. At this point, a value of the shift register 111 is immediately captured into the buffers 112-1 to 112-3 and 113. The command/synchronization identification code determination circuit 114 performs the comparison determination.

Figure 8B:
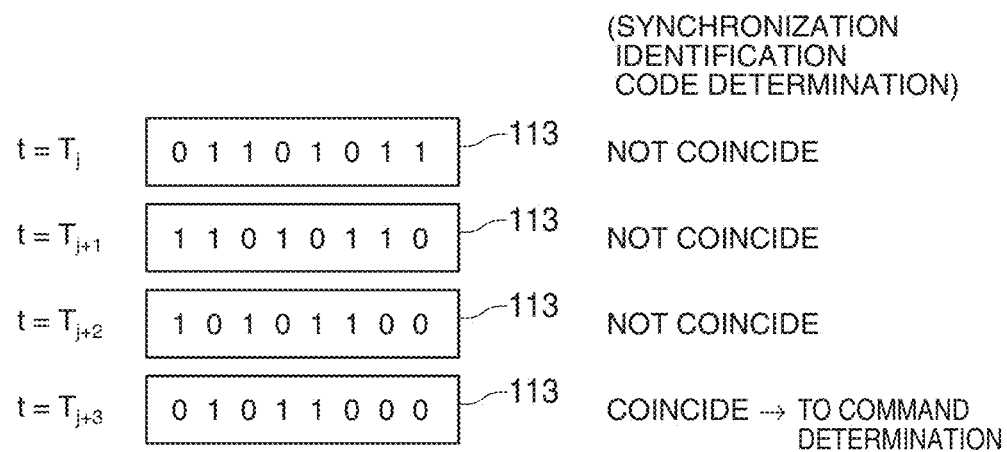

That is, every time the value of the shift register 111 shifts in synchronization with the clock signal SCLK, the command/synchronization identification code determination circuit 114 performs the comparison determination with an expected value concerning at least the synchronization identification code. FIG. 8B is a diagram showing the comparison determination concerning the synchronization identification code of the command/synchronization identification code termination circuit 114. Every time data of the buffer 113 shifts to the left by 1 bit, the command/synchronization identification code determination circuit 114 compares the data with an expected value '01011000'.

The commands 1 to 3 may be compared in the same manner as the synchronization identification code. However, when the synchronization identification code does not finally coincide with the expected value (e.g., the master selects another slave), comparison processing for the commands 1 to 3 is useless. Therefore, in this embodiment, for efficient processing, the comparison processing for the commands 1 to 3 with the expected values is executed after the synchronization identification code coincides with the expected value. In an example shown in FIG. 8B, at t=Tj to Tj+3, the command/synchronization identification code determination circuit 114 executes the comparison processing concerning only the synchronization identification code. After t=Tj+3 when the synchronization identification code coincides with the expected value, the command/synchronization identification code determination circuit 114 executes the comparison processing concerning the commands 1 to 3.

7. Data Transfer Timing During Error Occurrence

FIGS. 9A to 10B are diagrams for explaining data transfer in the SPI communication of the four-wire system and the three-wire system during error occurrence. The same components as the components shown in FIGS. 1 to 8B are denoted by the same reference numerals and explanation of the components is omitted.

Figure 9A:
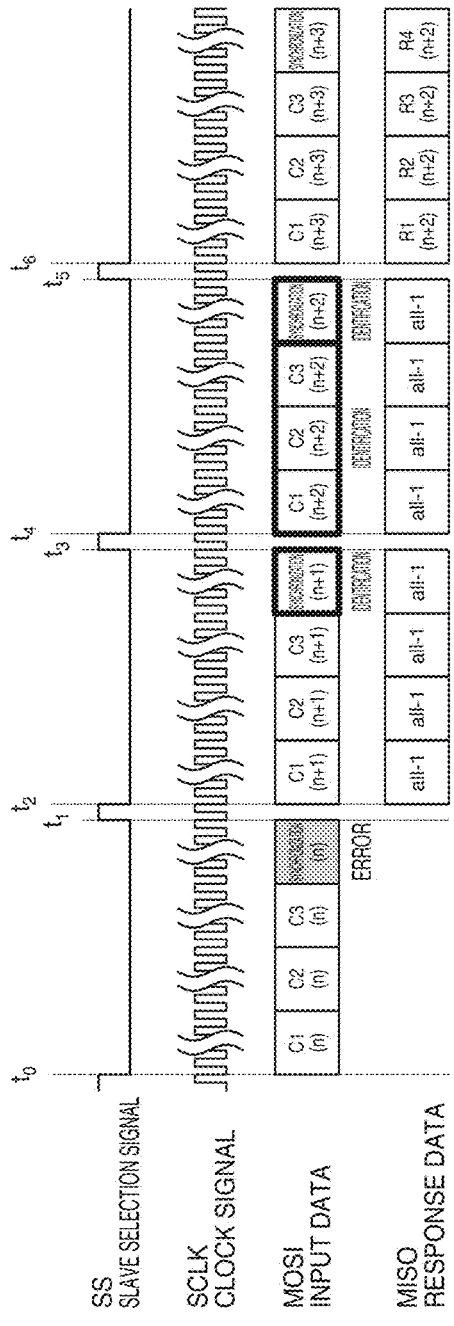
FIGS. 9A and 9B are diagrams respectively showing correspondence of synchronization identification code errors in the SPI communication of the four-wire system and the three-wire system.

FIG. 9A shows a state in which, in the SPI communication of the four-wire system, the synchronization (n) of the input data does not coincide with an expected value '01011000' and a fixed value (all−1), all bits of which are '1', is serially output as response data (corresponding to the synchronization identification code error, see SER in FIG. 4).

A flag included in the response data during normal operation changes to '1' when an error occurs. When synchronization is realized with the master, by changing a flag of a specific bit (e.g., CEF bit) to '1', it is possible to communicate the occurrence of the error to the master side. However, in the case of the synchronization identification code error, it is likely that a shift has occurred in timing of the response data received by the master. Therefore, the response data, all of 32 bits of which are '1', is serially output to enable the master to recognize that the error flag is '1' even when the master receives the response data from a bit position deviating from a normal bit position.

The serial communication circuit 10 keeps the response data at the fixed value (all–1) until all of the set of input data (i.e., the commands and the synchronization identification code) can be identified. In an example shown in FIG. 9A, the serial communication circuit 10 serially outputs normal response data R1(n+2) to R4(n+2) after identifying C1(n+2) to C3(n+2) and synchronization (n+2).

Figure 9B:
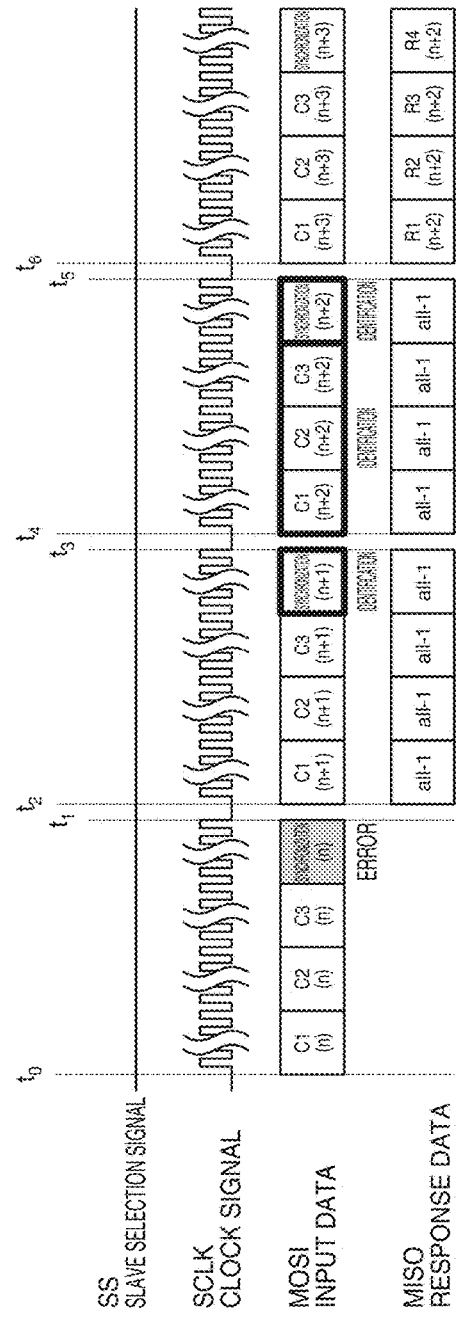

FIG. 9B is a timing chart in the SPI communication of the three-wire system. However, since the timing chart is the same as the timing chart in the case of FIG. 9A, i.e., in the SPI communication of the four-wire system, explanation of the timing chart is omitted.

Figure 10A:
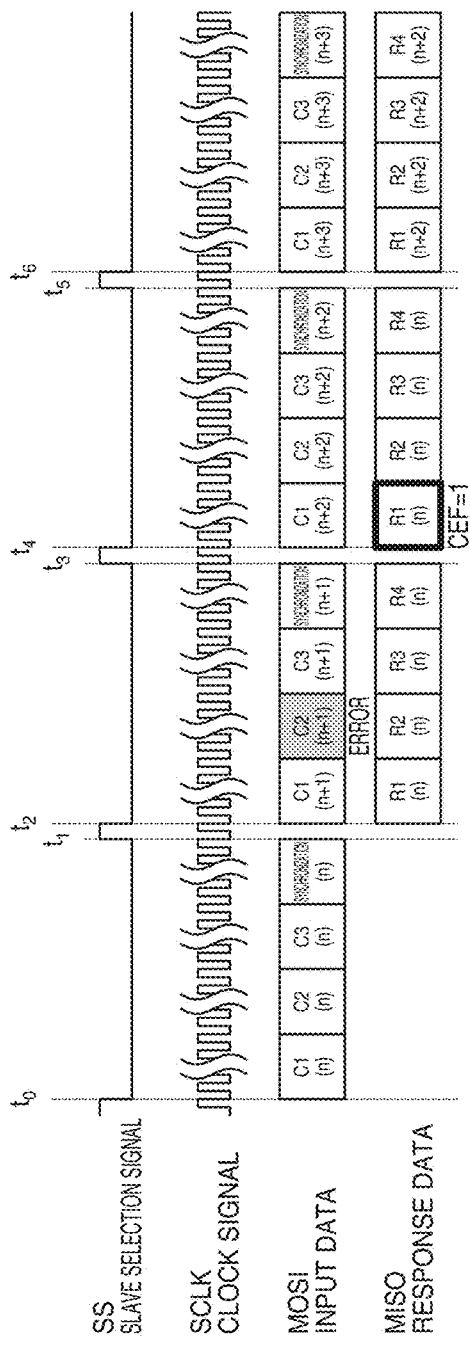
FIGS. 10A and 10B are diagrams showing correspondence of command errors in the SPI communication of the four-wire system and the three-wire system.

FIG. 10A shows a state in which, in the SPI communication of the four-wire system, C2(n+1) in the input data does not coincide with the expected value and an error occurs and the response data serially output immediately preceding C2 (n+1) is retransmitted with the command error flag (CEF) set as '1' (corresponding to the command error, see CEF in FIG. 4).

At this point, the master and the serial communication are synchronized. Therefore, the command error flag (CEF) is set to '1' to enable the master to easily recognize the occurrence of the command error. The serial communication circuit 10 neglects commands C1(n+1) to C3(n+1) including an error.

Figure 10B:
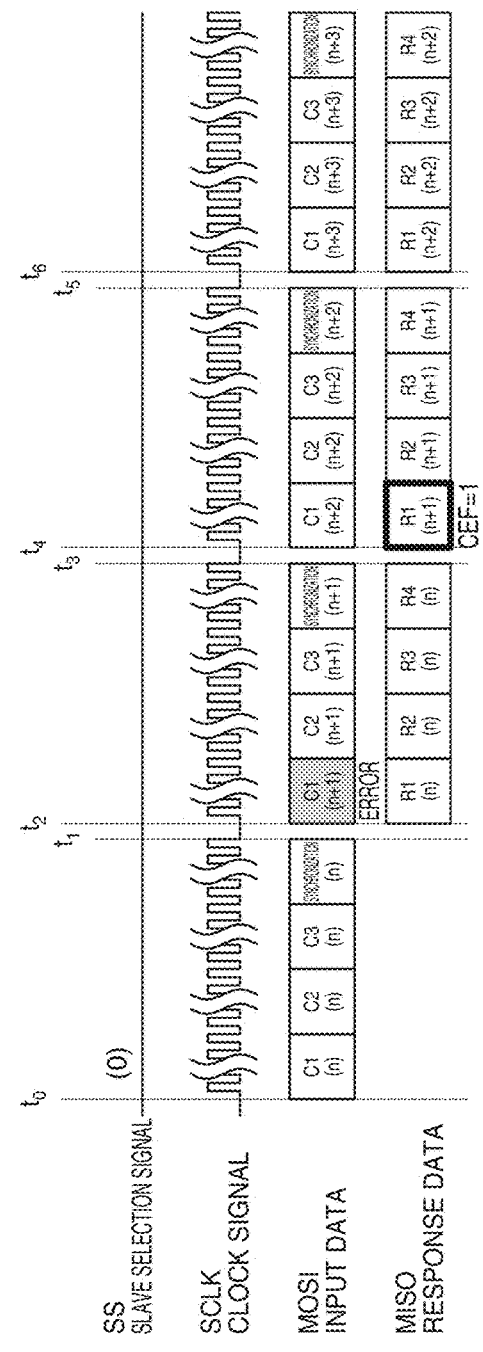

FIG. 10B is a timing chart in the SPI communication of the three-wire system. The SPI communication of the three-wire system in FIG. 10B is different from the SPI communication of the four-wire system in FIG. 10A only in that an error occurs in C1(n+1). Otherwise, the SPI communication of the three-wire system is the same as the SPI communication of the four-wire system. Explanation of the SPI communication of the three-wire system is omitted.

In FIGS. 9A to 10B, as explained using the example of 4-byte continuous transfer, a measure against an error is the same when transmission and reception of data is performed in 1-byte units and when transmission and reception of data is performed in 2-byte units.

8. Input Data and Response Data

FIGS. 11 and 12 are diagrams respectively showing specific examples of input data (commands and a synchronization identification code) and response data used by the serial communication circuit 10.

As shown in FIG. 11, the input data is 4-byte (32-bit) data. High-order 3 bytes indicate the command and low-order 1 byte indicates the synchronization identification code. The command is divided byte by byte and referred to as command 1, command 2, and command 3 from the high-order side.

When the master requests the physical quantity measuring device 1 including the serial communication circuit to output, for example, a physical quantity (in this embodiment, angular velocity), the master transmits a first command of total 4 bytes including the command codes (the commands 1 to 3) of 3 bytes and the synchronization identification code of 1 byte. In this embodiment, the synchronization identification code is common to all the commands. As a specific example, the command (the third command) that the master transmits in requesting NOP is '00110000_00011010_00001111_01011000'.

In order to perform highly reliable communication, it is important that the serial communication circuit 10 correctly determines reception of the synchronization identification code. Therefore, it is preferable that the synchronization identification code and the commands 1 to 3 are substantially different as codes and are not confused.

In this embodiment, the synchronization identification code '01011000' is different by 2 bits or more compared with arbitrary one of the commands 1 to 3. Therefore, even if a 1-bit error (inversion of a bit) accidentally occurs because of the influence of noise or the like during reception of a command, the serial communication circuit 10 does not recognize the command as the synchronization identification code by mistake. Since the error is processed as a command error, the master can take an appropriate measure. Concerning the command (a command code) including the commands 1 to 3, a certain command code and another command code are different by two bits or more. Therefore, even if a 1-bit error (inversion of a bit) accidentally occurs because of the influence of noise or the like during reception of a command, the serial communication circuit 10 does not process the command as another command by mistake.

FIG. 12 is a specific example of the response data. The command error flag (CEF) is included in response data to all the commands in common. Therefore, the master can easily grasp occurrence of a command error.

As explained above, in the case of the synchronization identification code error, a fixed value, all bits of which are '1', is serially output as the response data. In this embodiment, the response data to all the commands includes a command peculiar ID. Therefore, when the response data is retransmitted in the case of a command error, the master can easily grasp the occurrence of the command error because the command error flag (CEF) is '1' and because the command peculiar ID is the same as the command peculiar ID of the last response data.

9. Flowchart

Figure 16:
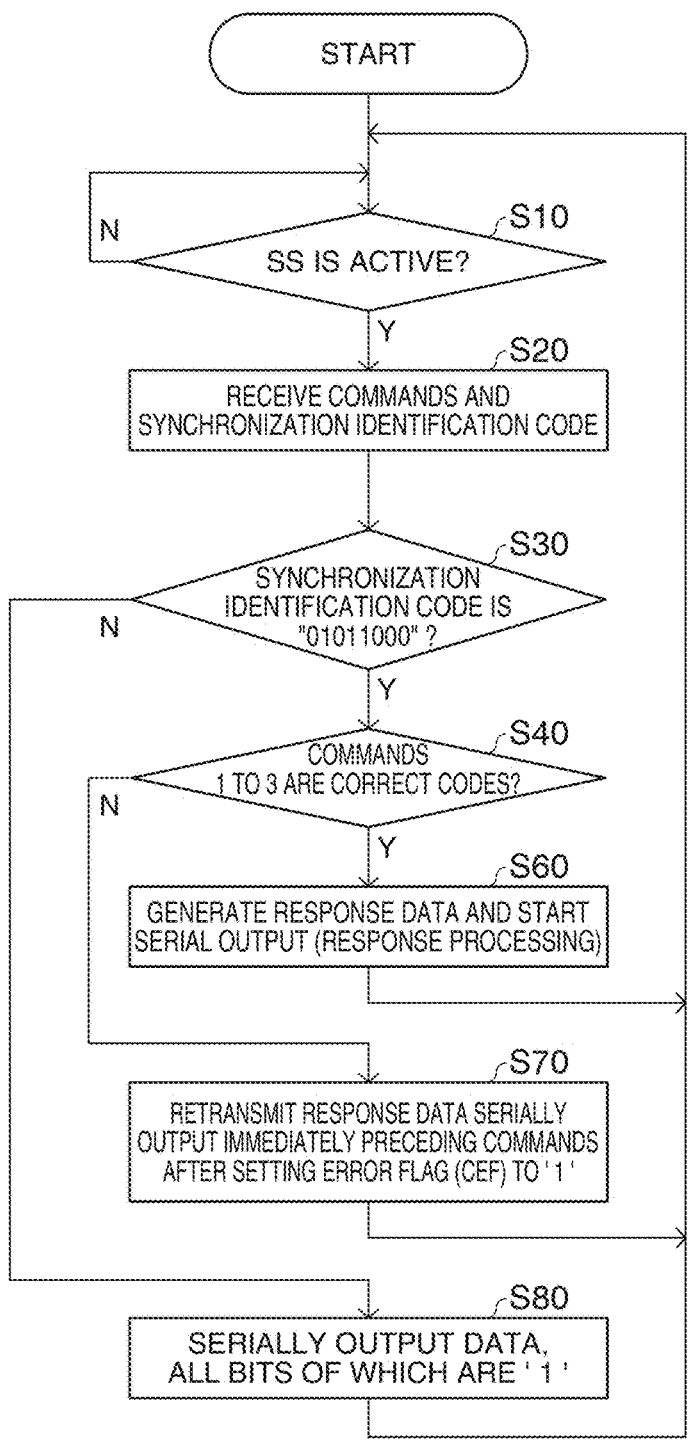
FIG. 16 is a flowchart for explaining a communication method by the serial communication circuit in the embodiment.

FIG. 16 is a flowchart for explaining communication control (a serial communication method) performed by the serial communication circuit 10. The serial communication circuit 10 checks whether the slave selection signal SS is active ('0') in both the case of the SPI communication of the four-wire system and the case of the SPI communication of the three-wire system (S10). If the slave selection signal SS is inactive ('1') (N in S10), the serial communication circuit 10 neglects at least one of the clock signal SCLK and the input data MOSI and returns to step S10.

If the slave selection signal SS is active ('0') (Y in S10), the serial communication circuit 10 receives the set of input data (the commands and the synchronization identification code) (S20). The serial communication circuit 10 determines whether the synchronization identification code is the expected value '01011000' (S30). If the synchronization identification code is not finally '01011000' and a synchronization identification code error occurs (N in S30), the serial communication circuit 10 serially outputs response data, all bits of which are '1', and returns to step S10 (S80).

When the synchronization identification code is the expected value '01011000' (Y in S30), the serial communication circuit 10 compares the commands 1 to 3 with the expected values and determines whether the commands 1 to 3 are correct codes (S40). When the commands 1 to 3 are not finally the correct codes and a command error occurs (N in S40), the serial communication circuit 10 retransmits response data serially output immediately preceding the commands after setting the error flag (CEF) to '1' (S70) and returns to step S10.

When the commands 1 to 3 are correct codes (Y in S40), the serial communication circuit 10 generates response data on the basis of the commands including the commands 1 to 3 and starts serial output (S60) and returns to step S10. When another kind of response processing (e.g., NOP) is requested by the command, the serial communication circuit 10 executes the response processing.

10. Electronic Apparatus

The physical quantity measuring device 1 including the serial communication circuit 10 in this embodiment may be a part of an electronic apparatus 200. The electronic apparatus 200 is explained with reference to FIGS. 17 to 18. The same components as the components shown in FIGS. 1 to 16 are denoted by the same reference numerals and signs and explanation of the components is omitted.

Figure 17:
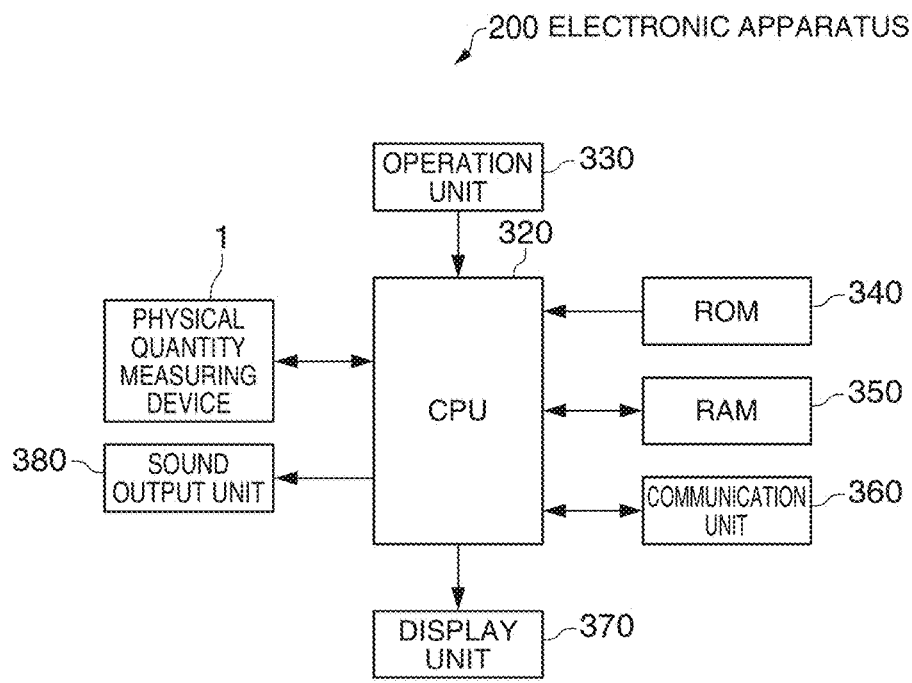
FIG. 17 is a functional block diagram of an electronic apparatus.

FIG. 17 is a functional block diagram of the electronic apparatus 200. The electronic apparatus 200 includes the physical quantity measuring device 1, a CPU (Central Processing Unit) 320, an operation unit 330, a ROM (Read Only Memory) 340, a RAM (Random Access Memory) 350, a communication unit 360, a display unit 370, and a sound output unit 380. In the electronic apparatus 200, a part of the components (the units) shown in FIG. 17 may be omitted or changed or other components may be added.

The physical quantity measuring device 1 detects and outputs a physical quantity such as angular velocity according to a command received from the CPU 320. The physical quantity measuring device 1 and the CPU 320 perform the SPI communication of the four-wire system or the SPI communication of the three-wire system. The CPU 320 corresponds to the master devices 100A and 100B shown in FIGS. 3A and 3B.

The CPU 320 performs, according to a computer program stored in the ROM 340 or the like, various kinds of calculation processing using data and the like received from the physical quantity measuring device 1. The CPU 320 performs various kinds of control processing. For example, the CPU 320 performs various kinds of processing corresponding to an operation signal received from the operation unit 330, processing for controlling the communication unit 360 in order to perform data communication with the outside, processing for transmitting a display signal for causing the display unit 370 to display various kinds of information, and processing for causing the sound output unit 380 to output various kinds of sound.

The operation unit 330 is an input device including operation keys and button switches. The operation unit 330 outputs an operation signal corresponding to operation by a user to the CPU 320.

The ROM 340 has stored therein computer programs, data, and the like for the CPU 320 to perform the various kinds of calculation processing and control processing.

The RAM 350 is used as a work area of the CPU 320. The RAM 350 temporarily stores a computer program and date read out from the ROM 340, data input from the operation unit 330, a result of calculation executed by the CPU 320 according to various computer programs.

The communication unit 360 performs various kinds of control for establishing data communication between the CPU 320 and an external apparatus.

The display unit 370 is a display device including an LCD (Liquid Crystal Display). The display unit 370 displays various kinds of information on the basis of a display signal input from the CPU 320.

The sound output unit 380 is a device configured to output sound such as a speaker.

In the electronic apparatus 200, the physical quantity measuring device 1 including the serial communication circuit 10 is used. Therefore, reliability of serial communication with the CPU 320, which is a master, is high. The electronic apparatus 200 can be connected to the physical quantity measuring device 1 without a problem irrespective whether the CPU 320 includes four terminals for communication of the SPI system or includes only three terminals for communication of the SPI system. Therefore, problems in terms of costs and product management caused by preparing a plurality of the physical quantity measuring device 1 according to the CPU 320 do not occur. Therefore, it is possible to provide the electronic apparatus 200 having high reliability and excellent in terms of costs.

As the electronic component 200, various electronic apparatuses are conceivable. Examples of the electronic apparatus 200 include personal computers (e.g., a mobile personal computer, a laptop personal computer, and a tablet personal computer), mobile terminals such as a cellular phone, digital still cameras, inkjet ejection apparatuses (e.g., an inkjet printer), storage area network apparatuses such as a router and a switch, local area network apparatuses, televisions, video cameras, video tape recorders, car navigation apparatuses, pagers, electronic notebooks (including an electronic notebook with a communication function), electronic dictionaries, electric calculators, electronic game apparatuses, game controllers, word processors, work stations, television telephones, security television monitors, electronic binoculars, POS terminals, medical apparatuses (e.g., an electronic thermometer, a blood manometer, a blood sugar meter, an electrocardiogram measurement device, an ultrasonic diagnosis device, and an electronic endoscope), fish finders, various measurement apparatuses, meters (e.g., meters for vehicles, airplanes, and ships), flight simulators, head-mounted displays, motion traces, motion tracking, motion controllers, and PDRs (pedestrian location direction measurement).

Figure 18:
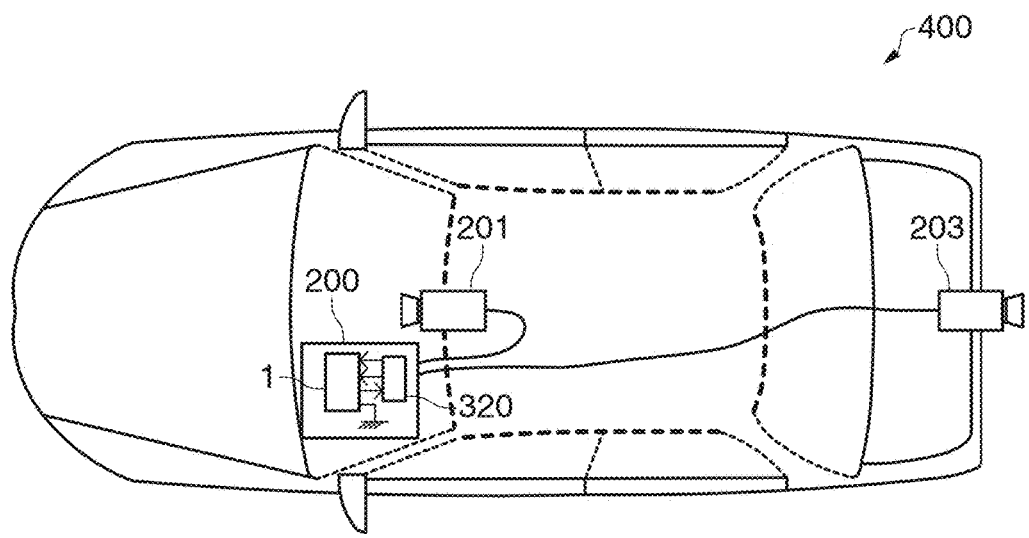
FIG. 18 is a diagram showing an example of a moving object.

FIG. 18 is a diagram schematically showing an automobile, which is an example of a moving object. A drive recorder (an example of a meter for a vehicle), which is an example of the electronic apparatus 200, is mounted on an automobile 400. The drive recorder is, for example, a device that processes videos of a front camera 201 and a rear camera 203 attached to the automobile 400 and stores necessary information. The CPU 320 can acquire, through serial communication, a physical quantity such as an angular velocity representing a traveling state of the automobile 400 from the physical quantity measuring device 1 and record the physical quantity in addition to the videos received from the front camera 201 and the rear camera 203.

Besides, the electronic apparatus 200 can be widely applied to electronic apparatus control units (ECUs: Electronic Control Units) such as keyless entry, an immobilizer, a car navigation system, a car air conditioner, an anti-lock braking system (ABS), an air bag, a tire pressure monitoring system (TPMS), an engine control, a battery monitor for a hybrid automobile and an electric automobile, and a vehicle body control system.

The invention is not limited to these illustrations and includes a configuration similar to the configuration explained in the embodiment (e.g., a configuration same in a function, a method, and a result or a configuration same in an object and an effect). The invention includes a configuration in which an unessential portion of the configuration explained in the embodiment is replaced. The invention includes a configuration that realizes action and the same effects as the action and effects of the configuration explained in the embodiment or a configuration that can attain the object as the object of the configuration explained in the embodiment. The invention includes a configuration obtained by adding a publicly-known technique to the configuration explained in the embodiment.

The entire disclosure of Japanese Patent Application No. 2012-234129 filed Oct. 23, 2012 is expressly incorporated by reference herein.

What is claimed is:

1. A serial communication circuit comprising:
   a receiving unit configured to serially receive input data including a command and a contiguous synchronization identification code that is different from the command and each of (i) indicates a slave device and (ii) indicates a time for starting response processing to be performed by the serial communication circuit, and to serially output bits of the input data including both the command and the synchronization identification code; and
   a determining unit configured to
      receive the bits of the input data serially output from the receiving unit,
      compare, each time one of the bits is serially output from the receiving unit, a predetermined number of the bits to a slave selection value associated with the slave device, and
      when the predetermined number of the bits coincide with the slave selection value, determine that the synchronization identification code has been received and instruct a start of the response processing based on the command.

2. The serial communication circuit according to claim 1, further comprising:
   a transmission control unit configured to control a serial output of response data, the serial output of the response data being the response processing, wherein
   the determining unit receives the command from the receiving unit and, based on the command, instructs the transmission control unit to generate the response data and the serial output of the response data.

3. The serial communication circuit according to claim 2, wherein when the synchronization identification code does not coincide with the slave selection value, the determining unit instructs the transmission control unit to serially output a fixed value as the response data.

4. An integrated circuit device comprising:
   the serial communication circuit according to claim 3;
   a first terminal configured to receive a slave selection signal indicating whether the serial communication circuit is selected;
   a second terminal configured to receive a clock signal;
   a third terminal configured to receive the input data; and
   a fourth terminal configured to serially output data based on the command, wherein
   the serial communication circuit serially receives, even when the first terminal is fixed to a predetermined value, the input data from the third terminal based on the clock signal received from the second terminal and performs, as the response processing, serial output of data based on the command from the fourth terminal.

5. A physical quantity measuring device comprising:
   the serial communication circuit according to claim 3; and
   a sensor unit including at least one sensor configured to detect a predetermined physical quantity, wherein
   the serial communication circuit receives detection data requested by the command from the sensor unit and executes the response processing using the detection data.

6. An electronic apparatus comprising the physical quantity measuring device according to claim 5.

7. A moving object comprising the electronic apparatus according to claim 6.

8. The serial communication circuit according to claim 2, wherein when an error is included in the command, the determining unit instructs the transmission control unit to retransmit the response data serially output immediately preceding the command after setting an error flag included in the response data to a predetermined value.

9. The serial communication circuit according to claim 2, wherein
   the transmission control unit generates the response data, wherein the response data is M bytes, M being an integer equal to or larger than 2, and
   the receiving unit receives the command and the synchronization identification code both having data sizes in byte units, which equal the M bytes when combined.

10. An integrated circuit device comprising:
    the serial communication circuit according to claim 2;
    a first terminal configured to receive a slave selection signal indicating whether the serial communication circuit is selected;
    a second terminal configured to receive a clock signal;
    a third terminal configured to receive the input data; and
    a fourth terminal configured to serially output data based on the command, wherein
    the serial communication circuit serially receives, even when the first terminal is fixed to a predetermined value, the input data from the third terminal based on the clock signal received from the second terminal and performs, as the response processing, serial output of data based on the command from the fourth terminal.

11. A physical quantity measuring device comprising:
    the serial communication circuit according to claim 2; and
    a sensor unit including at least one sensor configured to detect a predetermined physical quantity, wherein
    the serial communication circuit receives detection data requested by the command from the sensor unit and executes the response processing using the detection data.

12. An electronic apparatus comprising the physical quantity measuring device according to claim 11.

13. A moving object comprising the electronic apparatus according to claim 12.

14. The serial communication circuit according to claim 1, wherein the serial communication circuit uses the synchronization identification code, a value of which is different by at least two bits compared with a part or all of the command having the same number of bits as a number of bits of the synchronization identification code.

15. The serial communication circuit according to claim 14, wherein
    the input data includes a plurality of commands, and
    a first command and a second command included in the plurality of commands are different from each other by at least two bits.

16. An integrated circuit device comprising:
the serial communication circuit according to claim 1;
a first terminal configured to receive a slave selection signal indicating whether the serial communication circuit is selected;
a second terminal configured to receive a clock signal;
a third terminal configured to receive the input data; and
a fourth terminal configured to serially output data based on the command, wherein
the serial communication circuit serially receives, even when the first terminal is fixed to a predetermined value, the input data from the third terminal based on the clock signal received from the second terminal and performs, as the response processing, serial output of data based on the command from the fourth terminal.

17. A physical quantity measuring device comprising:
the serial communication circuit according to claim 1; and
a sensor unit including at least one sensor configured to detect a predetermined physical quantity, wherein
the serial communication circuit receives detection data requested by the command from the sensor unit and executes the response processing using the detection data.

18. An electronic apparatus comprising the physical quantity measuring device according to claim 17.

19. A moving object comprising the electronic apparatus according to claim 18.

20. A serial communication method comprising:
serially receiving input data including a command and a contiguous synchronization identification code that is different from the command; and each of (i) indicates a slave device and (ii) indicates a time for starting response processing to be performed by the serial communication circuit;
serially outputting bits of the input data including both the command and the synchronization identification code;
comparing, each time one of the bits is serially output, a predetermined number of the bits to a slave selection value associated with the slave device;
when the predetermined number of the bits coincide with the slave selection value, determining that the synchronization identification code has been received and instructing a start of the response processing based on the command.

\* \* \* \* \*